United States Patent
Lee et al.

(10) Patent No.: US 12,391,608 B2
(45) Date of Patent: Aug. 19, 2025

(54) GLASS STRENGTHENING MOLTEN SALT AND GLASS STRENGTHENING METHOD USING THE SAME

(71) Applicant: Samsung Display Co., Ltd., Yongin-si (KR)

(72) Inventors: Hyunji Lee, Gimhae-si (KR); Yongkyu Kang, Hwaseong-si (KR); Hoikwan Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 612 days.

(21) Appl. No.: 17/650,199

(22) Filed: Feb. 7, 2022

(65) Prior Publication Data

US 2022/0388902 A1  Dec. 8, 2022

(30) Foreign Application Priority Data

Jun. 2, 2021  (KR) .................. 10-2021-0071557

(51) Int. Cl.
  *C03C 21/00*   (2006.01)

(52) U.S. Cl.
  CPC ................. *C03C 21/002* (2013.01)

(58) Field of Classification Search
  CPC ................................................ C03C 21/002
  See application file for complete search history.

(56) References Cited

U.S. PATENT DOCUMENTS

| | | | | |
|---|---|---|---|---|
| 3,356,477 A | * | 12/1967 | Chisholm | C03C 21/002 65/30.14 |
| 9,828,286 B2 | | 11/2017 | Kashima et al. | |
| 10,112,863 B2 | | 10/2018 | Kim et al. | |
| 2009/0142484 A1 | * | 6/2009 | Isono | G11B 5/8404 427/127 |
| 2017/0113963 A1 | * | 4/2017 | Kim | C03B 25/08 |
| 2017/0313621 A1 | | 11/2017 | Kashima et al. | |
| 2018/0072619 A1 | | 3/2018 | Kashima et al. | |

FOREIGN PATENT DOCUMENTS

| | | | | |
|---|---|---|---|---|
| CN | 104291688 A | * | 1/2015 | ........... C03B 27/012 |
| CN | 104640821 A | * | 5/2015 | ........... C03C 21/002 |
| EP | 2075237 A1 | * | 7/2009 | ........... C03C 21/002 |
| JP | 2004259402 A | * | 9/2004 | ........... C03C 21/002 |
| JP | 6593227 B2 | | 10/2019 | |

(Continued)

OTHER PUBLICATIONS

Translation of CN 104291688 (Year: 2015).*

(Continued)

*Primary Examiner* — Cynthia Szewczyk
(74) *Attorney, Agent, or Firm* — Womble Bond Dickinson (US) LLP

(57) ABSTRACT

Provided is a glass strengthening method including preparing a glass and strengthening the glass by providing the glass with a molten salt, wherein the molten salt has a freezing point of about 220° C. or more and less than 320° C. In addition, the molten salt includes a first salt and a second salt that are different from each other, wherein the first salt is $KNO_3$, and the second salt includes at least one ion of $Li^+$, $Na^+$, $K^+$, $Cs^+$, and/or $Rb^+$.

12 Claims, 18 Drawing Sheets

(56) References Cited

FOREIGN PATENT DOCUMENTS

| KR | 10-1061650 B1 | 9/2011 |
| KR | 10-2017-0048633 A | 5/2017 |
| KR | 10-1821901 B1 | 1/2018 |
| KR | 10-2020-0085387 A | 7/2020 |
| WO | WO 2021-021393 A1 | 2/2021 |

OTHER PUBLICATIONS

Translation of CN 104640821 (Year: 2015).*
Translation of JP 2004-259402 (Year: 2004).*
Gulati, Suresh T.; Research Fellow & Consultant CORNING Incorporated; "Recent Advances in Improving Strength of Glass"; posted Mar. 29, 2015; 58pp. (https://documents.pub/document/recent-advances-in-improving-strength-of-glass-suresh-t-gulati-research-fellow-consultant-corning-incorporated).
Rouxel, Tanguy; "Eleastic Properties and Short-to Medium-Range Order in Glasses"; J. Am Ceram. Soc., 90 [10] Oct. 2007; pp. 3019-3039.

* cited by examiner

FIG. 9A
FIG. 9B
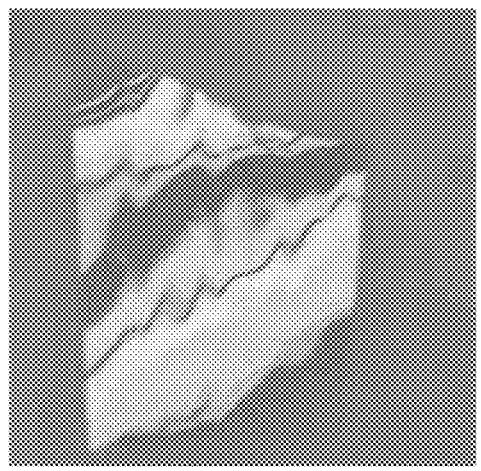
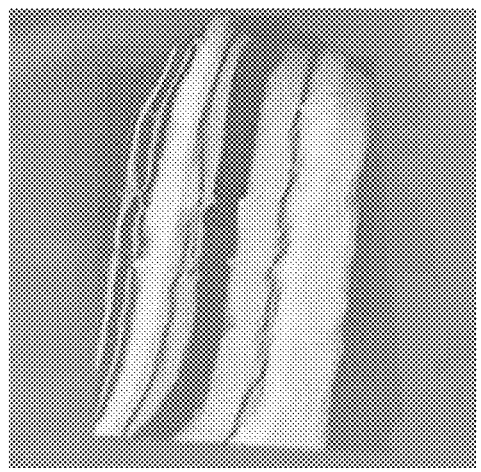
FIG. 9C
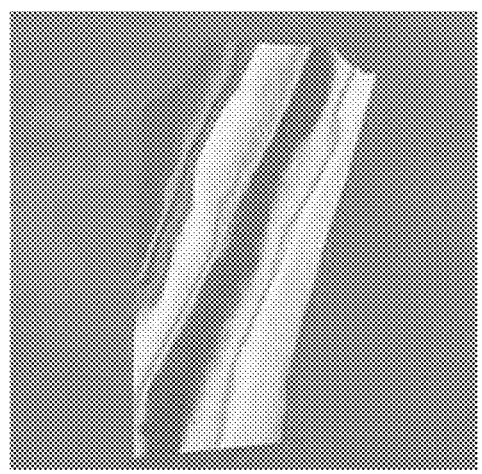

GLASS STRENGTHENING MOLTEN SALT AND GLASS STRENGTHENING METHOD USING THE SAME

CROSS-REFERENCE TO RELATED APPLICATIONS

This application claims priority to and the benefit of Korean Patent Application No. 10-2021-0071557, filed on Jun. 2, 2021, the entire contents of which are hereby incorporated by reference.

BACKGROUND

Field

Embodiments of the present disclosure herein relate to a glass strengthening molten salt and a glass strengthening method, and, for example, to a glass strengthening molten salt used for strengthening glass.

Description of the Related Art

Electronic devices such as televisions, mobile phones, tablet computers, and game consoles may include a cover glass, a display device, and a housing. A cover glass may provide a user with excellent appearance, while protecting a display device from the outside.

Recently, with the development of various shaped electronic devices, the thickness and the shape of a cover glass are also being developed or varied. For example, research to satisfy the desire for reducing the thickness of a cover glass and improving the impact resistance thereof is continuously conducted. For example, a cover glass may be subjected to heat treatment and/or chemical treatment for enhancing the rigidity thereof.

SUMMARY

Embodiments of the present disclosure strengthen a glass while minimizing or reducing damage to the exterior thereof.

Embodiments of the present disclosure provide a glass strengthening method including: preparing a glass, and strengthening the glass by providing the glass with a molten salt, wherein the molten salt has a freezing point equal to or higher than about 220° C. and less than about 320° C.

In some embodiments, the molten salt may include at least one ion of $Li^+$, $Na^+$, $K^+$, $Cs^+$, and/or $Rb^+$.

In some embodiments, the molten salt may include, as an additive, at least one of $KOH$, $K_2CO_3$, $K_3PO_4$, $Al_2(SO_4)_3$, $Al(NO_3)_2$, $K_2SiO_3$, $Na_2SiO_3$, $KCl$, $Ca(NO_3)$, and/or $Mg(NO_3)_2$.

In some embodiments, a mole fraction of the additive with respect to the molten salt may be 0 to about 0.01.

In some embodiments, the molten salt may include $KNO_3$ and $NaNO_3$, and a mole fraction of $NaNO_3$ with respect to $KNO_3$ and $NaNO_3$ may be more than about 0.05 and about 0.5 or less.

In some embodiments, the molten salt may further include $KOH$ as an additive, and a mole fraction of $KOH$ with respect to $KNO_3$, $NaNO_3$, and $KOH$ may be more than 0 and about 0.001 or less.

In some embodiments, the molten salt may further include $K_2CO_3$ as an additive, and a mole fraction of $KO_2CO_3$ with respect to $KNO_3$, $NaNO_3$, and $K_2CO_3$ may be more than 0 and about 0.01 or less.

In some embodiments, the molten salt may include $KNO_3$ and $KCl$, and a mole fraction of $KCl$ with respect to $KNO_3$ and $KCl$ is more than about 0.05 and about 0.1 or less.

In some embodiments, the preparing may include heating the glass to a first temperature.

In some embodiments, the first temperature is about 350° C. to about 400° C.

In some embodiments, the molten salt may be heated to the first temperature.

In some embodiments, the glass strengthening method may further include, after removing the glass from the molten salt, performing a post-heat treatment including heating the glass to a second temperature that is different from the first temperature.

In some embodiments, the second temperature may be about 220° C. to about 370° C.

In some embodiments, the glass may have a thickness of about 10 μm to about 50 μm.

In some embodiments, a compressive stress (CS) of the glass after the strengthening may be about 500 MPa to about 2000 MPa.

In some embodiments, a depth of layer (DOL) of the glass after the strengthening may be about 5 μm to about 10 μm.

In some embodiments, the molten salt may include $KNO_3$ and $KCl$, and a value of DOL/CS of the glass after the strengthening may be about 0.0113 μm/MPa or more.

In some embodiments of the present disclosure, a glass strengthening molten salt includes a first salt and a second salt that are different from each other, wherein the first salt is $KNO_3$ and the second salt includes at least one ion of $Li^+$, $Na^+$, $K^+$, $Cs^+$, and/or $Rb^+$, and the molten salt has a freezing point equal to or higher than about 220° C. and less than about 320° C.

In some embodiments, the glass strengthening molten salt may further include, as an additive, at least one of $KOH$, $K_2CO_3$, $K_3PO_4$, $Al_2(SO_4)_3$, $Al(NO_3)_2$, $K_2SiO_3$, $Na_2SiO_3$, $KCl$, $Ca(NO_3)$, and/or $Mg(NO_3)_2$, wherein the second salt may be $NaNO_3$, and a mole fraction of the second salt with respect to the first salt and the second salt may be more than about 0.05 and about 0.5 or less, and a mole fraction of the additive with respect to the first salt, the second salt and the additive may be 0 to about 0.01.

In some embodiments, the second salt may be $KCl$, and the mole fraction of the second salt with respect to the first salt and the second salt may be more than about 0.05 and about 0.1 or less.

BRIEF DESCRIPTION OF THE DRAWINGS

The accompanying drawings are included to provide a further understanding of the subject matter of the present disclosure, and are incorporated in and constitute a part of this specification. The drawings illustrate embodiments of the present disclosure and, together with the description, serve to explain principles of the present disclosure. In the drawings:

FIGS. 2A, 2B, 2C, 3, 4, 5A, 5B, 5C, 5D, 6, 7A, and 7B are cross-sectional views illustrating operations of a glass strengthening method according to an embodiment;

FIGS. 9A, 9B, and 9C are photographs showing the exterior of a glass of Comparative Example;

DETAILED DESCRIPTION

Figure 1:
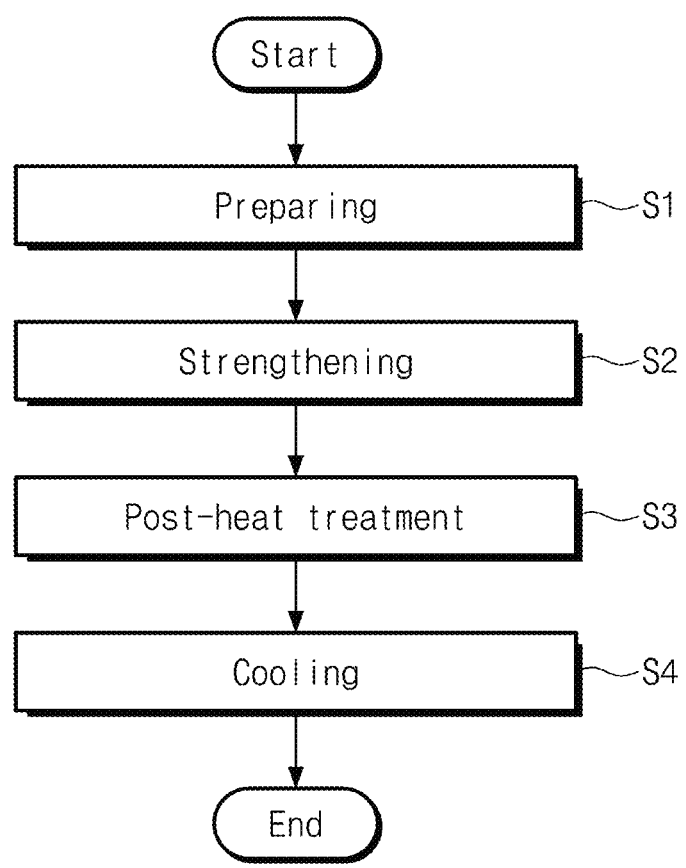
FIG. 1 is a flowchart of a glass strengthening method according to an embodiment.

In this specification, when a component (or region, layer, portion, etc.) is referred to as "on," "connected," or "coupled" to another component, it means that it is placed/connected/coupled directly on the other component or a third component can be between them.

The same reference numerals or symbols refer to the same elements. In addition, in the drawings, thicknesses, ratios, and dimensions of components may be exaggerated for effective description of technical content. "And/or" includes all combinations of one or more that the associated elements may define.

Terms such as first and second may be used to describe various components, but the components should not be limited by the terms. These terms are only used for the purpose of distinguishing one component from other components. For example, without departing from the scope of the present disclosure, a first component may be referred to as a second component, and similarly, a second component may be referred to as a first component. Singular expressions include plural expressions unless the context clearly indicates otherwise.

In addition, terms such as "below," "lower," "above," and "upper" are used to describe the relationship between components shown in the drawings. The terms are relative concepts and are described based on the directions indicated in the drawings.

Terms such as "include" or "have" are intended to designate the presence of a feature, number, step, action, component, part, or combination thereof described in the specification, and it should be understood that it does not preclude the possibility of presence or addition of one or more other features, numbers, steps, operations, components, parts, or combinations thereof.

Unless otherwise defined, all terms (including technical and scientific terms) used in this specification have the same meaning as commonly understood by one of ordinary skill in the art to which this disclosure belongs. In addition, terms such as terms defined in commonly used dictionaries should be interpreted as having a meaning consistent with the meaning having in the context of the related technology, and should not be interpreted as too ideal or too formal unless explicitly defined here.

Hereinafter, a glass strengthening molten salt of an embodiment, and a glass strengthening method of an embodiment will be described with reference to the accompanying drawings.

FIG. 1 is a flowchart of a glass strengthening method according to an embodiment. FIGS. 2A, 2B, 2C, 3, 4, 5A, 5B, 5C, 5D, 6, 7A, and 7B are cross-sectional views illustrating operations of a glass strengthening method according to an embodiment.

Referring to FIG. 1, a glass strengthening method according to an embodiment may include a preparing operation S1, a strengthening operation S2, a post-heat treatment operation S3, and a cooling operation S4.

Figure 2A:
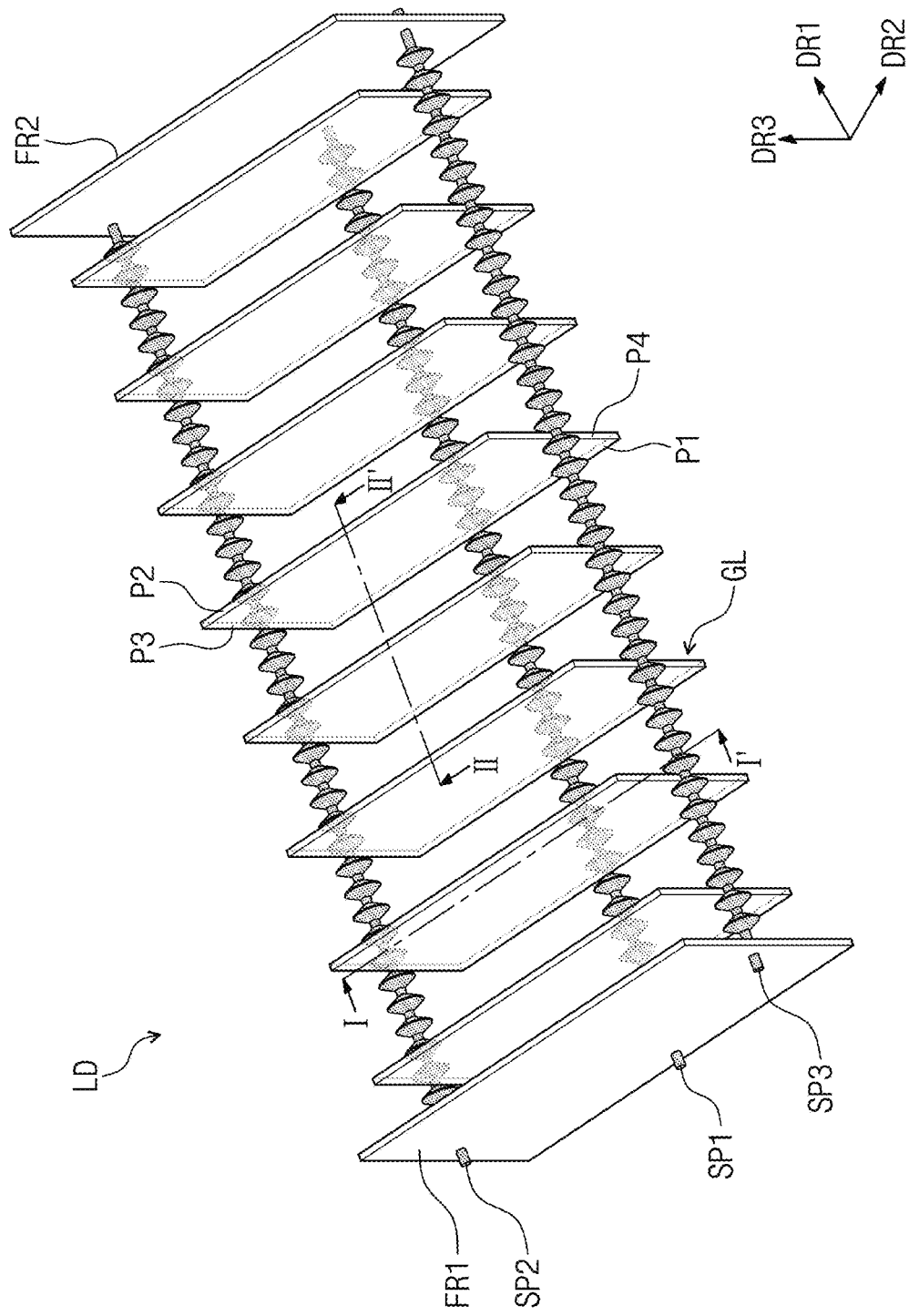
FIG. 2A is a perspective view of a glass loading device according to an embodiment.
Figure 2B:
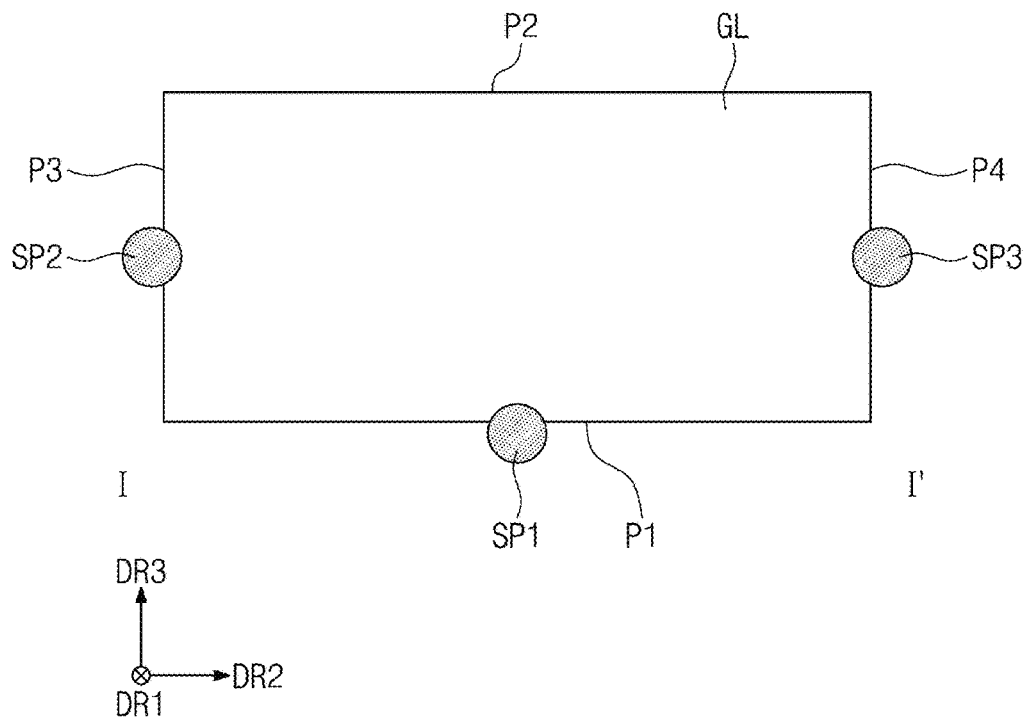
Figure 2C:
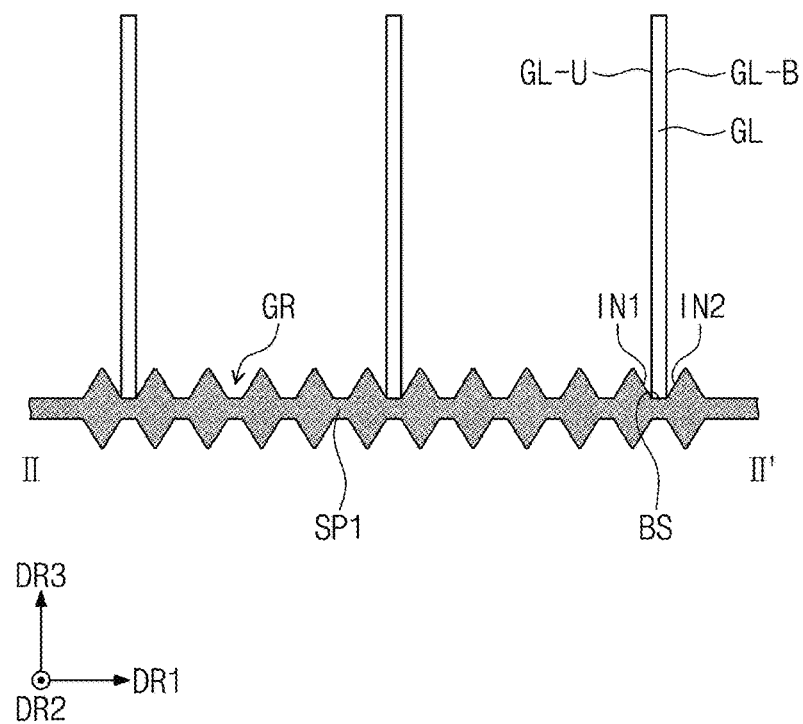

FIG. 2A is a perspective view of a glass loading device LD according to an embodiment. FIG. 2B is a cross-sectional view taken along I-I' of FIG. 2A. FIG. 2C is a cross-sectional view taken along II-II' of FIG. 2A.

Referring to FIGS. 1 and 2A together, in the preparing operation S1, a glass GL may be supplied to a loading device LD. In some embodiments, the glass GL may be a glass thin film. For example, the thickness of the glass GL may be at most about 100 μm, for example, about 10 μm to about 50 μm, or about 20 μm to about 30 μm. FIG. 2A illustrates that the glass GL is a glass, as an example. Hereinafter, the glass GL will be described as a glass. However, embodiments of the present disclosure are not limited thereto.

The glass GL may be loaded on the loading device LD. The loading device LD may accommodate at least one glass GL, and support and fix the glass GL.

The loading device LD of an embodiment may include a plurality of frames FR1 and FR2, and a plurality of supporting portions SP1, SP2, and SP3.

The plurality of frames FR1 and FR2 may include a first frame FR1 and a second frame FR2. The first frame FR1 and the second frame FR2 may be spaced apart along a first direction DR1, and face each other. The plurality of frames FR1 and FR2 may include a heat-resistant material which does not (or substantially does not) deform at a high temperature. For example, the frames FR1 and FR2 may include a metal material or a carbon composite which does not (or substantially does not) deform even at about 400° C., but embodiments of the present disclosure are not limited thereto.

The plurality of supporting portions SP1, SP2, and SP3 may be connected to the first frame FR1 and the second frame FR2. The first frame FR1 and the second frame FR2 may support the plurality of supporting portions SP1, SP2, and SP3.

The plurality of supporting portions SP1, SP2, and SP3 may each extend along one direction (e.g., the first direction DR1). A plurality of glasses GL may be arranged along a direction (e.g., the first direction DR1) in which the supporting portions SP1, SP2, and SP3 extend. The plurality of glasses GL may be loaded so that a normal direction of the upper surfaces of the glasses GL are parallel (e.g., substantially parallel) to an extension direction (e.g., the first direction DR1) of the supporting portions SP1, SP2, and SP3. For example, a length of a longest side of each glass GL may be perpendicular (e.g., substantially perpendicular) to the extension direction (e.g., the first direction DR1) of the supporting portions SP1, SP2, and SP3. FIG. 2A illustrates a perspective view of the first to third supporting portions SP1, SP2, and SP3 extending along the first direction DR1, and the plurality of glasses GL arranged along the first direction DR1, as an example.

The plurality of glasses GL may be loaded so that the upper surfaces and the lower surfaces thereof are parallel (e.g., substantially parallel) to a direction of a gravitational force, thereby preventing or reducing deflection of the glass due to gravity. In a strengthening process of the glass GL, the plurality of glasses GL may be exposed to a high-temperature environment, and may be more easily deflected in the high-temperature environment than in a room-temperature environment. However, the loading device LD of an embodiment may prevent or reduce deflection of the glass GL. The shapes and sizes of the plurality of supporting portions SP1, SP2, and SP3 are not limited to the embodiment illustrated in FIG. 2A. FIG. 2A illustrates the plurality of supporting portions SP1, SP2, and SP3 having the same shape and size as an example, but embodiments of the present disclosure are not limited thereto. The loading device LD may include supporting portions having shapes and sizes that are different from each other.

The plurality of supporting portions SP1, SP2, and SP3 may include a heat-resistant material which does not (e.g., substantially does not) deform at a high temperature. For example, the supporting portions SP1, SP2, and SP3 may include a material which does not (e.g., substantially does not) deform at a temperature of about 400° C. The plurality of supporting portions SP1, SP2, and SP3 may include an erosion-resistant material which is not easily damaged by a high-temperature molten salt used in the strengthening of the glass GL.

The first to third supporting portions SP1, SP2, and SP3 may each be connected to the first and second frames FR1 and FR2. For example, an end of the first supporting portion SP1 may be connected to the first frame FR1, and the other end of the first supporting portion SP1 may be connected to a second frame FR2, so that the first supporting portion SP1 (or a portion thereof) may be between the first frame FR1 and the second frame FR2. The second supporting portion SP2 and the third supporting portion SP3 may also be connected to the first frame FR1 and the second frame FR2 in substantially the same manner as the first supporting portion SP1.

The plurality of supporting portions SP1, SP2, and SP3 may each support and fix the glasses GL loaded on the loading device LD. Accordingly, the glasses GL may be moved while being loaded on the loading device LD.

In an embodiment, the glass GL may include an upper surface (or front surface), a lower surface (or rear surface), and side surfaces P1, P2, P3, and P4 connecting the upper surface and the lower surface. The upper surface and the lower surface of the glass GL may be parallel (e.g., substantially parallel) to the first frame FR1 and the second frame FR2.

The side surfaces P1, P2, P3, and P4 of the glass GL may include a first side surface P1 and a second side surface P2 extending along the second direction DR2, and a third side surface P3 and a fourth side surface P4 extending along the third direction DR3. The first side surface P1 and the second side surface P2 face each other (e.g., face away from each other) in the third direction DR3, and the third side surface P3 and the fourth side surface P4 face each other (e.g., face away from each other) in the second direction DR2.

The glass GL loaded on the loading device LD may be in a state in which the upper surface, the lower surface, and the side surfaces P1, P2, P3, and P4 thereof are exposed to the outside. In a strengthening operation to be further described herein below, the glass GL may be immersed in a molten salt while being loaded on the loading device LD. In this case, the upper surface, the lower surface, and the side surfaces P1, P2, P3, P4 of the glass GL may contact (e.g., physically contact) the molten salt.

FIG. 2B is a cross-sectional view taken along line I-I' illustrated in FIG. 2A.

Referring to FIG. 2B, in an embodiment, the first supporting portion SP1 may support the first side surface P1 of the glass GL. When lifting the loading device LD, the glass GL may be supported by the first supporting portion SP1.

The second supporting portion SP2 may support the third side surface P3 of the glass GL. The third supporting portion SP3 may support the fourth side surface P4 of the glass GL. The second supporting portion SP2 and the third supporting portion SP3 may prevent or reduce swinging of the glass GL left and/or right.

FIG. 2B illustrates that the side surfaces of the glass GL supported by the first to third supporting portions SP1, SP2, and SP3 are different from each other, but embodiments of the present disclosure are not limited thereto. For example, at least two of the first to third supporting portions SP1, SP2, and SP3 may support the same side surface of the glass GL.

In addition, in another embodiment, the loading device LD may further include an additional supporting portion. For example, the loading device LD may include four supporting portions which respectively support the first to fourth side surfaces P1, P2, P3, and P4 of the glass GL.

FIG. 2C is a cross-sectional view taken along line II-II' illustrated in FIG. 2A. FIG. 2C illustrates a partial cross-sectional view of a first supporting portion SP1 of a plurality of supporting portions SP1, SP2, and SP3, and glasses GL supported on the first supporting portion SP1, as an example. Hereinafter, description regarding the first supporting portion SP1 may be similarly applied to a second supporting portion SP2 and a third supporting portion SP3, and the first supporting portion SP1 is referred to as the first supporting portion SP1.

Referring to FIG. 2C, a plurality of grooves GR arranged along a direction in which the first supporting portion SP1 extends may be formed in the first supporting portion SP1. For example, FIG. 2C illustrates the grooves GR regularly formed along the first direction DR1, as an example.

The plurality of grooves GR may respectively support the plurality of glasses GL. The plurality of glasses GL may be loaded on some grooves GR of the plurality of grooves GR so as to adjust a spacing between the glasses GL, but embodiments of the present disclosure are not limited thereto. The plurality of glasses GL may be loaded respectively corresponding to the plurality of grooves GR. For example, each groove GR may support one of the plurality of glasses GL.

The grooves GR may be each formed by a bottom surface BS and inner surfaces IN1 and IN2. The inner surfaces IN1 and IN2 may be independently inclined at set or predetermined angles with respect to the bottom surface BS. The bottom surface BS may face one of the side surfaces of the glass GL loaded in the groove GR. The inner surfaces IN1 and IN2 may respectively face one surface GL-U and the other surface GL-B of the glass GL loaded in the groove GR.

As described above, the preparing operation S1 may include loading the glass GL in the loading device LD. In addition, the preparing operation S1 may include pre-heating the loaded glass GL.

Figure 3:
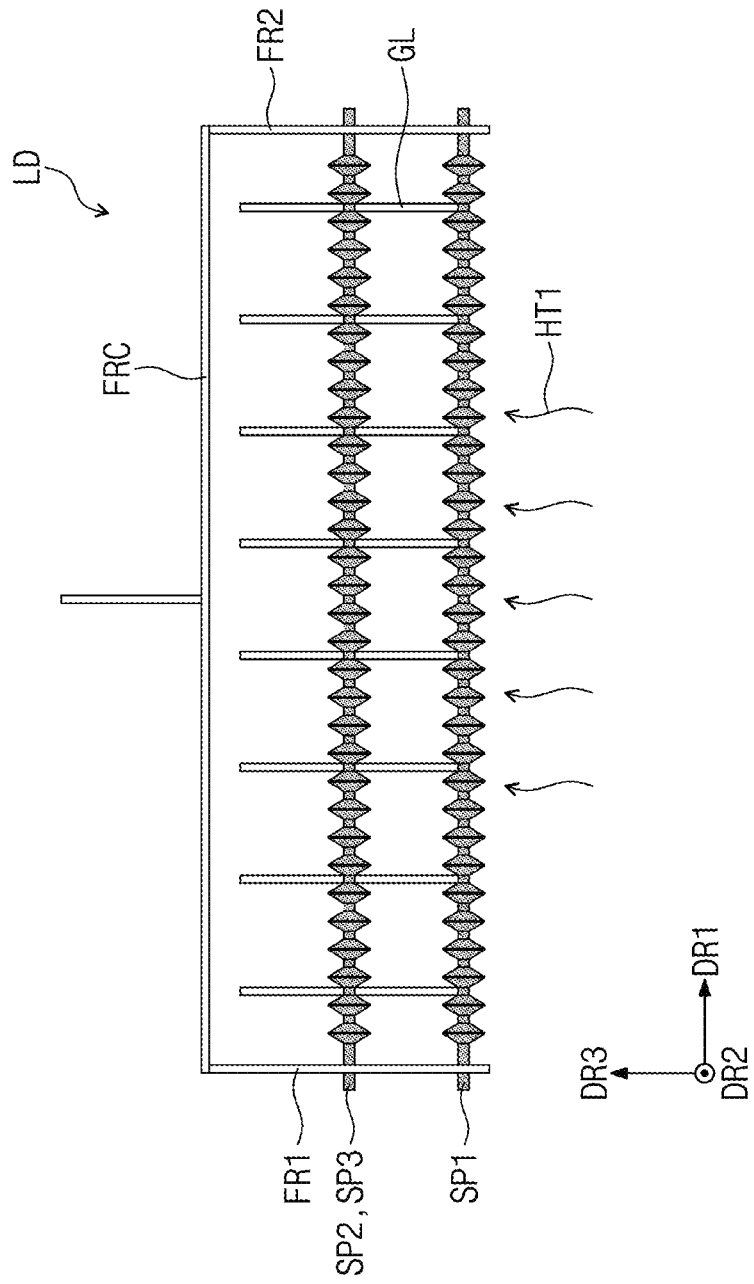

Referring to FIG. 3, a plurality of glasses GL may be heated to (or by) a first temperature HT1, after being loaded on the loading device LD. Here, the loading device LD may be heated to (or by) the first temperature HT1 along with the plurality of glasses GL.

When the glasses GL and the loading device LD are brought into contact (e.g., physical contact) with a high-temperature molten salt SLa (see FIG. 4) suddenly (e.g., too quickly), the glasses GL and/or the loading device LD may be damaged. To prevent or reduce damage to the glasses GL and the loading device LD, the preparing operation S1 (see FIG. 1) may include heating the glasses GL and the loading device LD to (or by) the first temperature HT1 slowly. The first temperature HT1 may be substantially the same as the temperature at which the salt is melted. For example, the first temperature HT1 may be about 350° C. to about 400° C.

In some embodiments, the loading device LD may further include a connecting frame FRC. The connecting frame FRC may connect the first frame FR1 and the second frame FR2. By moving the connecting frame FRC, the frames FR1 and FR2, the supporting portions SP1, SP2, and SP3, and the loaded glasses GL may be moved at a time (e.g., at a same time). For example, by moving the connecting frame FRC, the frames FR1 and FR2, the supporting portions SP1, SP2, and SP3, and the loaded glasses GL may be moved together with each other.

Figure 4:
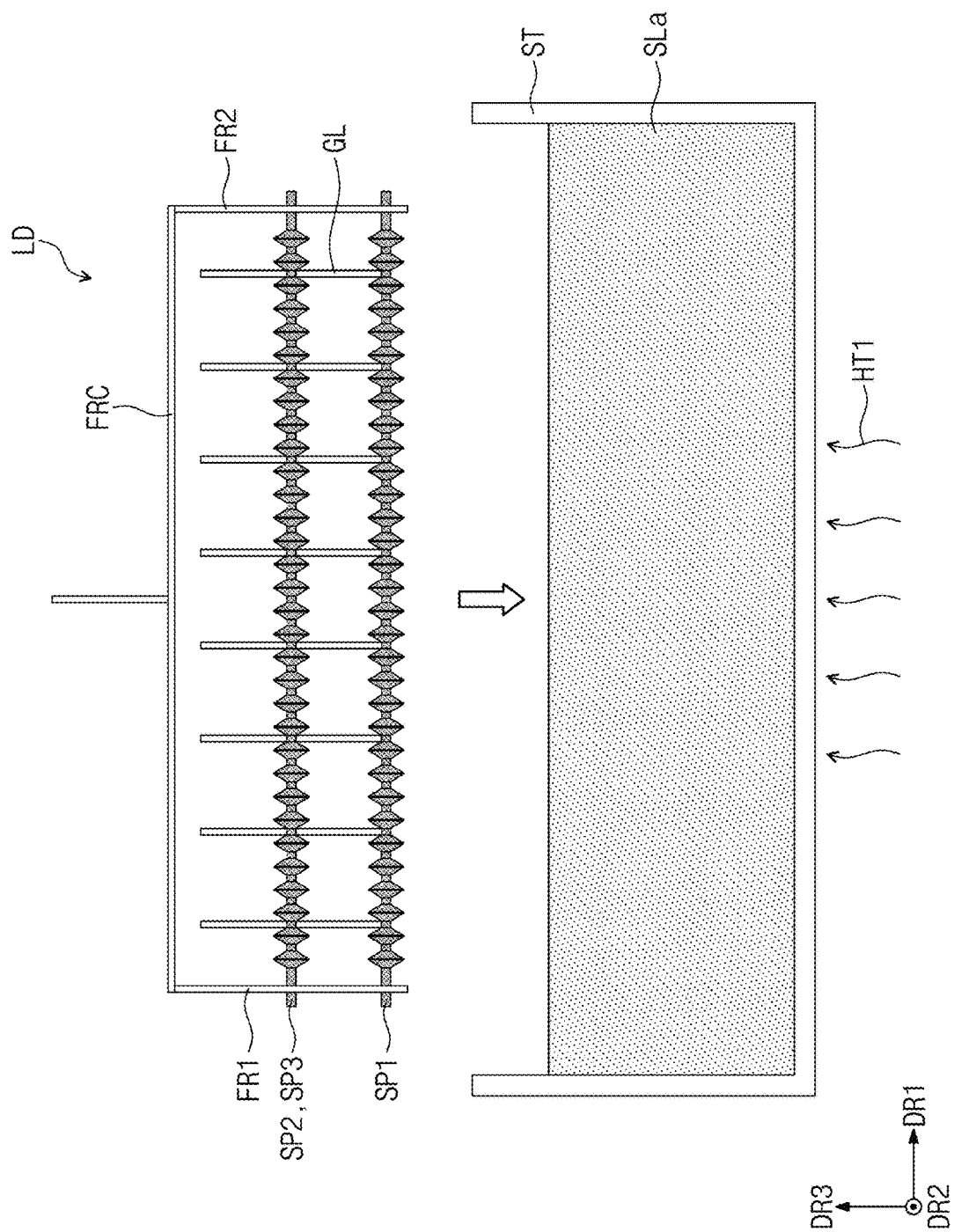

Referring to FIG. 4, the loading device LD on which a plurality of glasses GL are loaded may be provided over a bath ST. The bath ST may accommodate the molten salt Sla. The bath ST may be maintained at the first temperature HT1 so as to suitably or sufficiently melt a salt to form the molten salt Sla. As described above, the first temperature HT1 may be about 350° C. to about 400° C. When the first temperature HT1 is lower than about 350° C., the salt may not be suitably or sufficiently melted, and ion exchange may occur unsuitably or insufficiently in the strengthening operation S2 (see FIG. 1) to be further described herein below. Accordingly, chemically strengthening the glass GL may be unsuitably or insufficiently achieved. When the first temperature HT1 is higher than about 400° C., the Young's modulus of the glass GL may decrease, so that the glass GL may be easily deformed.

The freezing point of the molten salt SLa of the present disclosure satisfies the range equal to or higher than about 220° C. and less than about 320° C. For example, the freezing point of the molten salt SLa may be about 220° C. to about 315° C.

When the freezing point of the molten salt is lower than about 220° C., a resultant glass may not obtain a suitable or sufficient compressive stress. Accordingly, the resultant glass is susceptible to external stress, and may be easily damaged. When the freezing point of a molten salt is about 320° C. or higher, the viscosity thereof may increase compared to a molten salt having a freezing point equal to or higher than about 220° C. and less than about 320° C., so that the amount of a salt remaining in the glass may increase in the post-heat treatment operation S3 (see FIG. 1) to be further described herein below.

Because the molten salt SLa of the present disclosure satisfies the range equal to or higher than about 220° C. and less than about 320° C., the glass GL may be suitably or sufficiently strengthened, and the frozen amount of the residual salts existing on the surface of the glass may be minimized or reduced.

To perform the strengthening operation S2, the loading device LD may be moved into the bath ST, and the plurality of glasses GL may be immersed in the molten salt SLa.

Figure 5A:
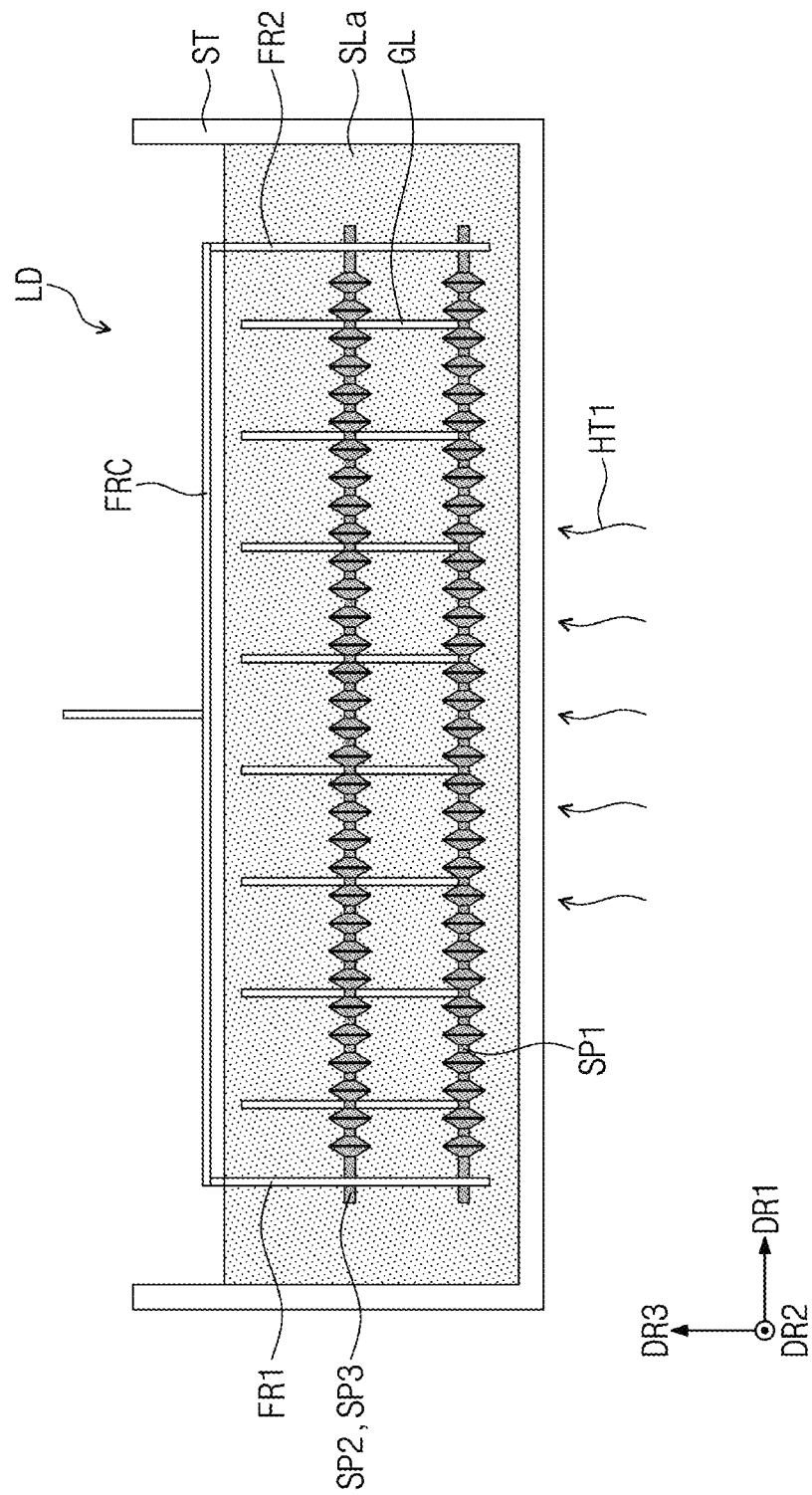

Referring to FIGS. 1 and 5A, the strengthening operation S2 may provide a plurality of glasses GL with the molten salt SLa (e.g., may place the plurality of glasses GL in physical contact with the molten salt Sla). The plurality of glasses GL may be chemically strengthened while contacting (e.g., physically contacting) the molten salt SLa having a high temperature. For example, ions included in the plurality of glasses GL and ions included in the molten salt SLa may be exchanged with each other, thereby increasing the rigidity of the plurality of glasses GL. The glasses GL may be immersed in the bath ST at the first temperature HT1 for a set or predetermined time so as to exchange ions. Ion exchange will be further described with reference to FIGS. 5B and 5C.

Figure 5B:
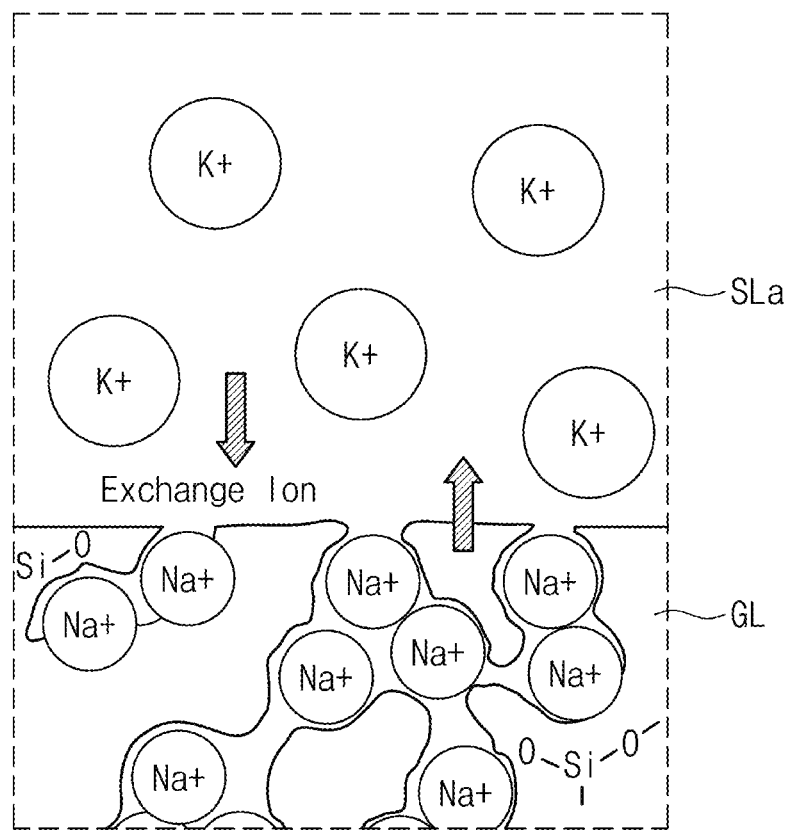

Referring to FIG. 5B, the molten salt SLa may include at least one of a lithium ion ($Li^+$), a sodium ion ($Na^+$), a potassium ion ($K^+$), a cesium ion ($Cs^+$), and/or a rubidium ion ($Rb^+$). In addition, the diameter of an ion included in the molten salt SLa may be greater than the diameter of an ion included in the glass GL.

It is illustrated that the molten salt SLa includes potassium ions ($K^+$), as an example. The glass GL may include $SiO_2$ as a main component, and may further include an additional component such as $Al_2O_3$, $LiO_2$, and/or NaO. FIG. 5B illustrates that the glass GL includes $SiO_2$ and sodium ions ($Na^+$), as an example.

Due to the difference in ion concentration, the potassium ions may diffuse to (or into) the glass GL, and the sodium ions may diffuse to (or into) the molten salt SLa.

Figure 5C:
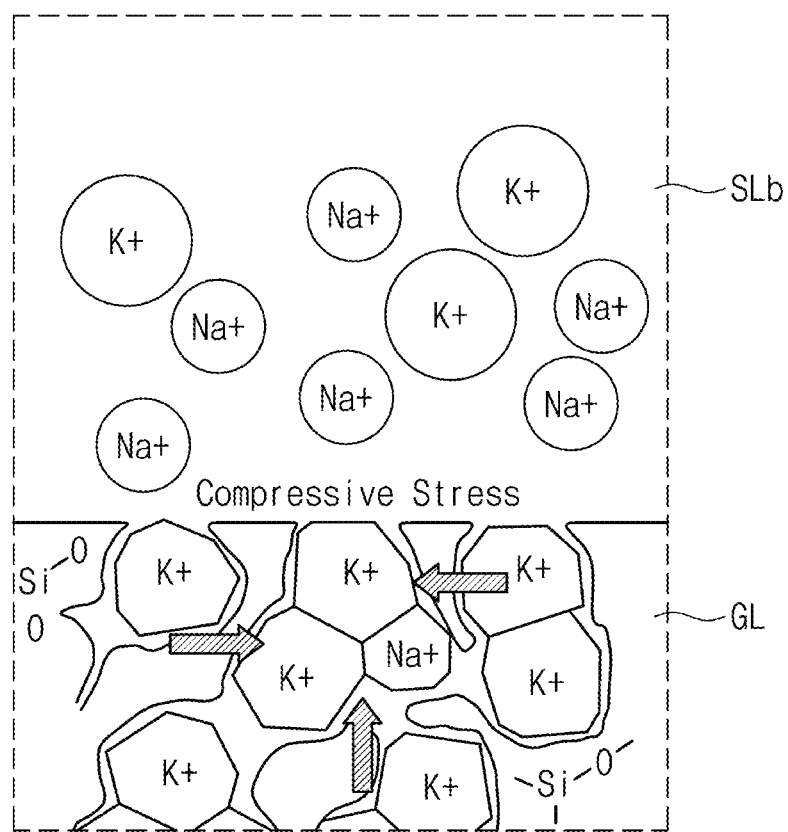

FIG. 5C illustrates ionic components of the molten salt SLb and the glass GL after diffusion. Referring to FIG. 5C, the molten salt SLb may include not only the potassium ions, but also the sodium ions diffused from the glass GL. At least the surface of the glass GL may include the potassium ions diffused from the molten salt SLa (see FIG. 5B).

In the surface of the glass GL, the sodium ions may be replaced with the potassium ions larger in diameter than the sodium ions, thereby generating a compressive stress on the glass GL. The glass GL may be strengthened by the compressive stress.

The degree of strengthening of the glass GL may be changed in accordance with the thickness of an ion-exchanged portion. Insufficiently or excessively exchanging ions may cause damage to the glass GL. Accordingly, it is necessary that ion exchange be performed at a suitable or appropriate temperature for a suitable or appropriate time in the strengthening of the glass GL.

However, embodiments of the present disclosure are not limited to the molten salts SLa and SLb of FIGS. 5B and 5C, and thus, the molten salt SLa may include at least two of a lithium ion (Lit), a sodium ion (Nat), a potassium ion ($K^+$), a cesium ion ($Cs^+$), and/or a rubidium ion ($Rb^+$). For example, the molten salt SLa may include a potassium ion ($K^+$), and a sodium ion ($Na^+$). Even in this case, the concentration of the potassium ions included in the molten salt SLa may be controlled to be higher than the concentration of the potassium ions included in the glass GL, and the concentration of the sodium ions included in the molten salt SLa may be controlled to be lower than the concentration of the sodium ions included in the glass GL. Accordingly, the potassium ions may diffuse to (or into) the glass GL, and the sodium ions may diffuse to (or into) the molten salt SLa, thereby strengthening the glass GL.

Figure 5D:
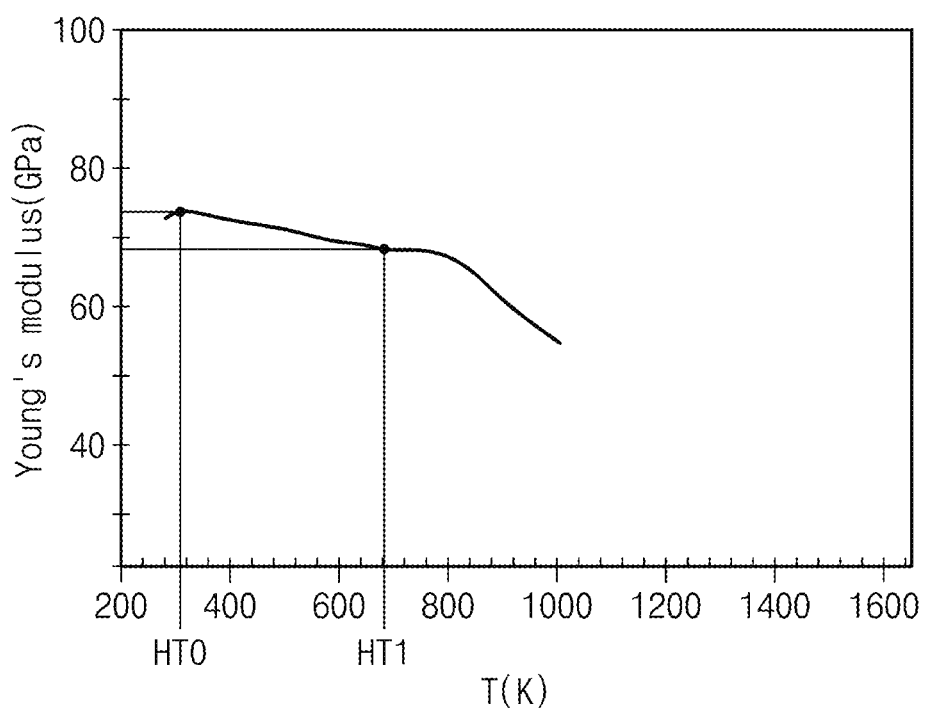

FIG. 5D is a graph showing a Young's modulus versus a temperature of a glass GL. The Young's modulus of the glass GL may decrease as the temperature increases, and the decrease in the Young's modulus may cause the rigidity of the glass GL to be lowered.

Referring to the graph of FIG. 5D, the Young's modulus of the glass GL may be about 65 GPa to about 75 GPa at room temperature HT0. The Young's modulus of the glass GL at the first temperature HT1 may be smaller than that at room temperature HT0.

As the Young's modulus of the glass GL decreases, the rigidity of the glass GL may decrease, so that the exterior shape of the glass GL may be relatively easily deformed. Accordingly, when the first temperature HT1 is higher than about 400° C., the glass GL may be deformed, for example, deflected and/or wrinkled.

Accordingly, in the preparing operation S1 and the strengthening operation S2, the glass GL may be pre-heated at the first temperature HT1 satisfying the range of about 350° C. to about 400° C., and immersed in the molten salt SLa of the first temperature HT1.

Figure 6:
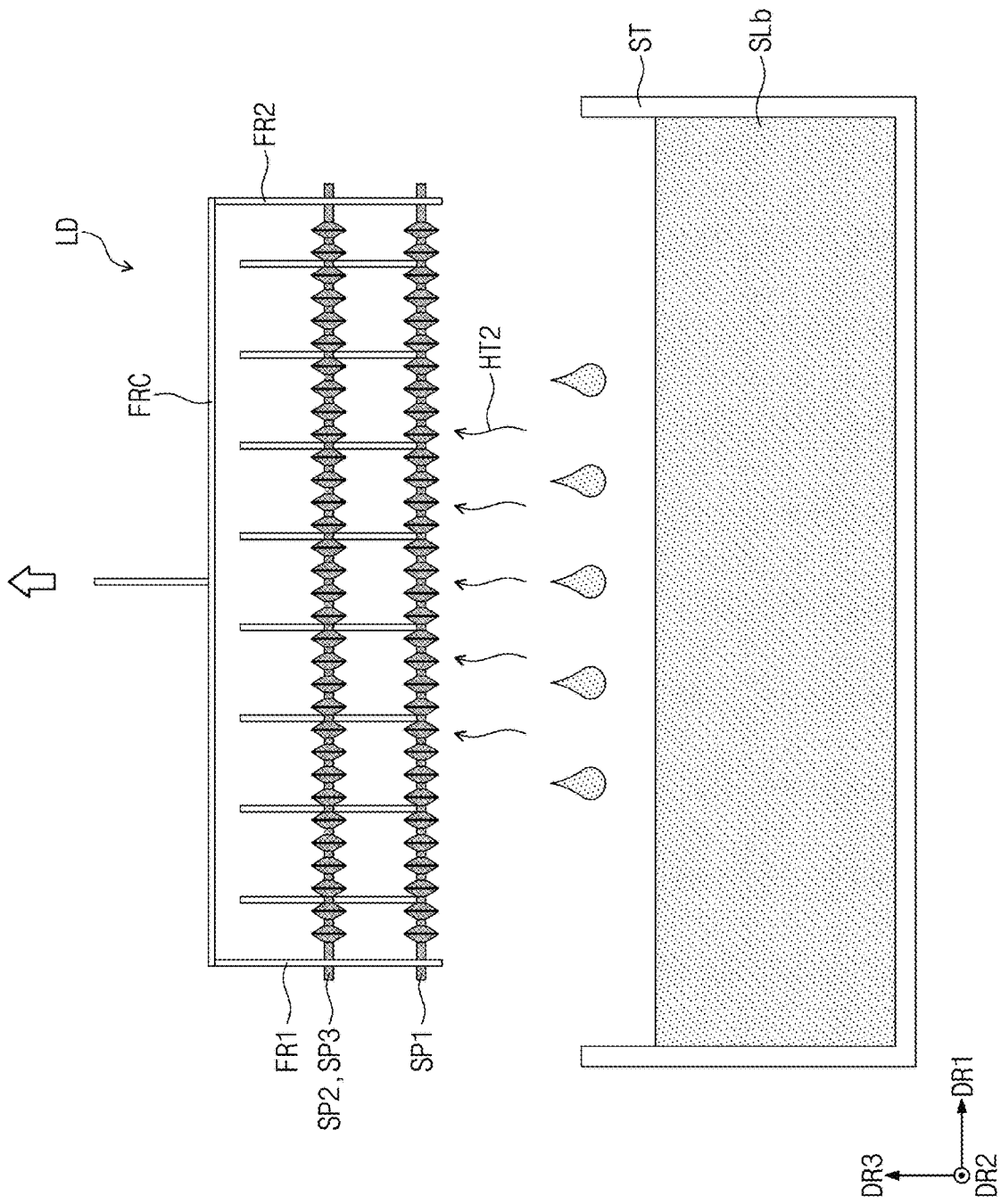

Referring to FIGS. 1 and 6, in the post-heat treatment operation S3, the glass GL is removed from the molten salt SLb, and heated to (or by) a second temperature HT2.

In the post-heat treatment operation S3, the loading device LD on which the plurality of glasses GL are loaded may be separated from the bath ST in which the molten salt SLb is accommodated. The molten salt SLb remaining in the bath ST may be a molten salt SLb after performing ion exchange with the glass GL.

In the post-heat treatment operation S3, the plurality of glasses GL and the loading device LD are heated to (or by) the second temperature HT2. Accordingly, salts remaining on the plurality of glasses GL and the loading device LD may be removed by falling down without freezing. The residual salts may be a part of the molten salt SLb.

In an embodiment, the second temperature HT2 may have a range different from the range of the first temperature HT1. The second temperature HT2 may satisfy a range of about 220° C. to about 370° C. Because the freezing point of the molten salt SLa of the present disclosure satisfies the range equal to or higher than about 220° C. and less than about 320° C., the molten salt SLa has a suitable or sufficient fluidity at the second temperature HT2. Accordingly, in the post-heat treatment operation S3, the residual salts remaining on the plurality of glasses GL and the loading device LD may be removed by falling down to the bath ST without freezing.

When the second temperature HT2 exceeds 370° C., the residual salts remaining on the supporting portions SP1, SP2, and SP3, and/or the glasses GL may infiltrate into the glass GL. For example, the thickness of the residual salts infiltrating into the glass GL may increase, and excessive compressive stress may be applied to the glass GL, so that the exterior of the glass GL may be damaged.

When the second temperature HT2 is less than about 220° C., the viscosity of the molten salt SLb may increase, and the fluidity of the molten salt SLb may decrease, thereby increasing the amount of the residual salts on the supporting portion SP1, SP2, and SP3, and/or the glasses GL. In addition, because the second temperature HT2 is lower than the freezing point of the molten salt SLb, the frozen amount of the residual salts may increase.

Figure 7A:
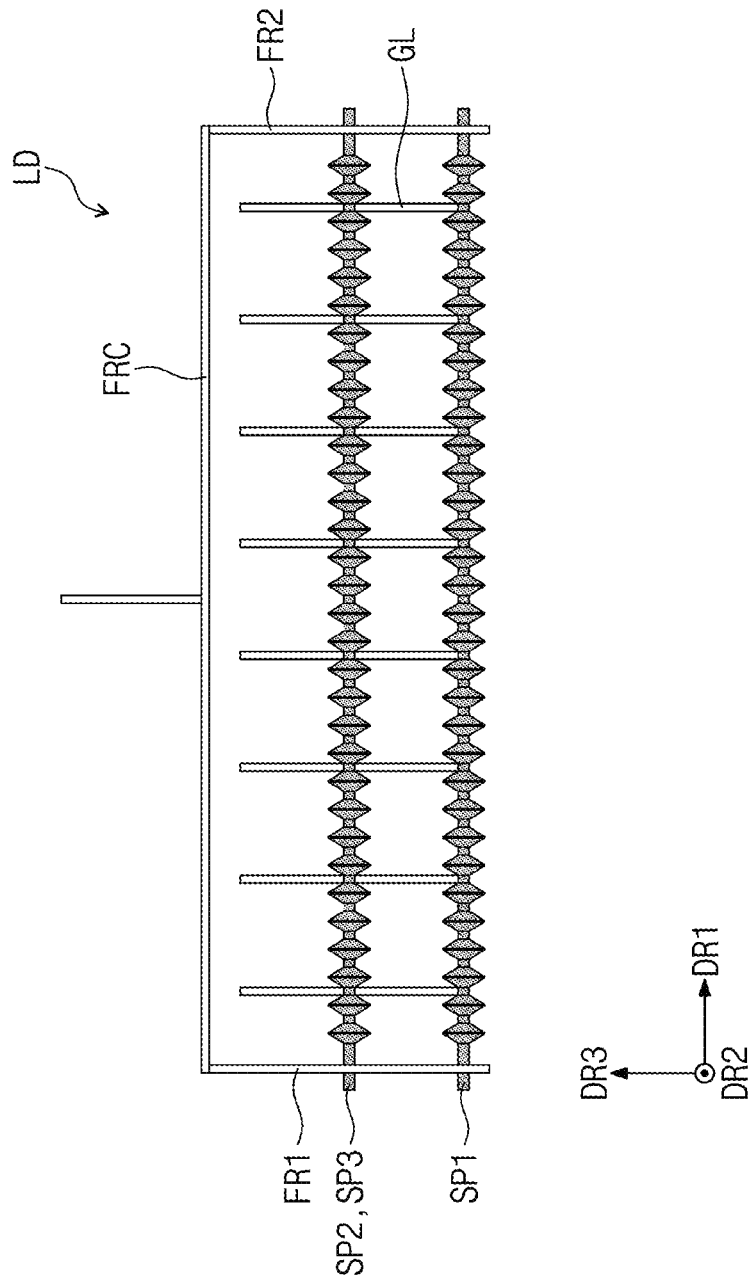

Referring to FIGS. 1 and 7A, in the cooling operation S4, the glasses GL and the loading device LD may be slowly cooled from the second temperature HT2 to room temperature. The plurality of glasses GL, which have been subjected to the post-heat treatment, may be cooled at room temperature while being loaded on the loading device LD. Then, the strengthening of the glasses GL may be completed through washing and drying the plurality of glasses GL.

Figure 7B:
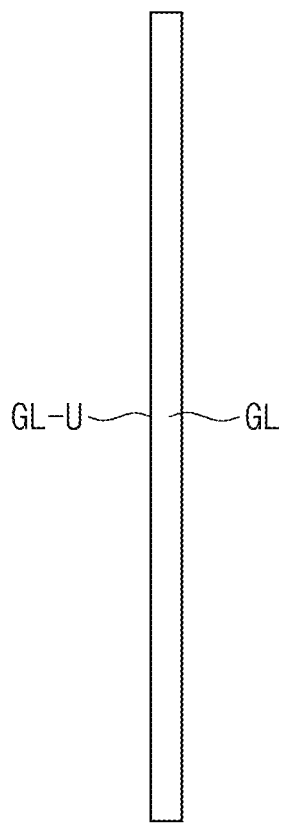

FIG. 7B is a cross-sectional view of a glass GL according to an embodiment on which the cooling operation S4 has been completely performed. In the glass strengthening method according to an embodiment of the present disclosure, the glasses GL may be strengthened in the strengthening operation S2 by using the molten glass Sla, of the present disclosure, having a freezing point equal to or higher than about 220° C. and less than about 320° C. Accordingly, the glass GL may have a substantially flat surface GL-U, and exhibit excellent appearance quality without (or substantially without) damage caused by residual salts.

Figure 7C:
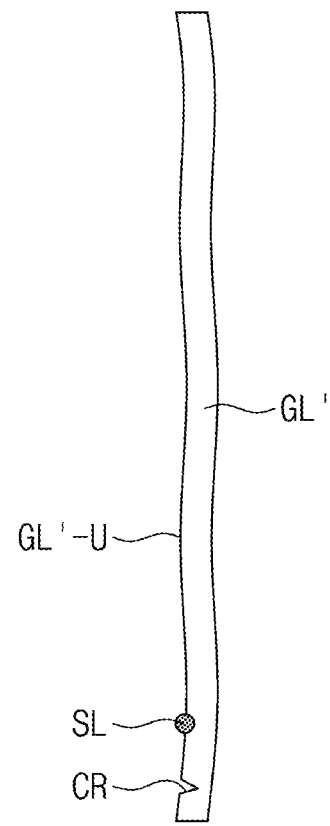
FIG. 7C is a cross-sectional view of a glass strengthened by a glass strengthening method according to Comparative Example.

FIG. 7C is a cross-sectional view of a glass GL' strengthened by a glass strengthening method according to a Comparative Example. The glass strengthening method according to the Comparative Example may include strengthening a glass by using a molten salt of which the freezing point does not satisfy the range equal to higher than about 220° C. and less than about 320° C.

Accordingly, residual salts SL may be frozen on the surface GL'-U of the glass GL'. The thermal expansion coefficient of the residual salts SL is different from that of the glass GL', so that the glasses GL' may be subjected to interfacial stress in a process in which the residual salts SL are frozen. Accordingly, the appearance quality of the glass GL' may be deteriorated or reduced by the residual salts SL. As the thickness of the glass GL' becomes smaller, the surface GL'-U of the glass GL' may be more susceptible to interfacial stress. For example, the glass GL' may be deflected and/or wrinkled by the residual salts SL. The residual salts SL may be frozen on the surface GL'-U of the glass GL' in a condensed state, thereby generating irregularities on the surface GL'-U of the glass GL'. In addition, the glass GL' receives stress caused by the frozen residual salts SL, and may thus form cracks CR therein, or may be dented and/or broken.

In the glass strengthening method of the present disclosure, the glass GL having an excellent surface GL-U may be provided by strengthening the glass GL by using the molten salt SLa having a freezing point equal to or higher than about 220° C. and less than about 320° C.

Hereinafter, a glass strengthening molten salt according to an embodiment of the present disclosure will be further described. Description regarding a glass strengthening molten salt to be described herein below may be applied to a molten salt SLa.

The glass strengthening molten salt according to an embodiment of the present disclosure includes a first salt and a second salt different from each other, and satisfies the range of a freezing point equal to or higher than about 220° C. and less than about 320° C. For example, the first salt is $KNO_3$, and the second salt includes a salt containing at least one ion of $Li^+$, $Na^+$, $K^+$, $Cs^+$, and/or $Rb^+$. For example, the second salt may be KCl, $NaNO_3$, and/or the like. The glass strengthening molten salt according to the present disclosure may satisfy the range of a freezing point equal to or higher than about 220° C. and less than about 320° C., and therefore a glass strengthening method with excellent appearance quality may be provided.

In an embodiment, the glass strengthening molten salt may include, as an additive, any one of KOH, $K_2CO_3$, $K_3PO_4$, $Al_2(SO_4)_3$, $Al(NO_3)_2$, $K_2SiO_3$, $Na_2SiO_3$, KCl, $Ca(NO_3)$, and/or $Mg(NO_3)_2$. For example, the mole fraction of an additive in the glass strengthening molten salt may be 0 to about 0.01. When the mole fraction of an additive is 0, the glass strengthening molten salt may not include an additive additionally. The glass strengthening molten salt may include an additive as necessary or desired to improve a glass strengthening degree.

In an embodiment, the glass strengthening degree may be assessed using the compressive stress (hereinafter, CS) value of a glass surface. The CS value of the glass strengthened by the glass strengthening method of embodiments of the present disclosure may be about 500 MPa to about 2000 MPa. When the CS value of the glass is less than about 500 MPa, the compressive stress of the glass surface is low, so that the glass surface may be easily damaged by an external stress. When the CS value of the glass is less than about 500 MPa, it may be understood that the glass is not strengthened sufficiently. The CS value of the glass strengthened by the glass strengthening method is about 500 MPa or more, so that the glass may have excellent appearance quality and improved strength.

In some embodiments, the glass strengthening molten salt according to embodiments of the present disclosure may include $KNO_3$ as the first salt, $NaNO_3$ as the second salt, and KOH and/or $K_2CO_3$ as the additive. For example, the glass strengthening molten salt according to some embodiments may include $KNO_3$, $NaNO_3$, and KOH. In some embodiments, the glass strengthening molten salt according to an embodiment may include $KNO_3$, $NaNO_3$, and $K_2CO_3$. However, embodiments of the present disclosure are not limited thereto.

In some embodiments, the mole fraction of $NaNO_3$ with respect to $KNO_3$ and $NaNO_3$ may be more than about 0.05 and equal to or less than about 0.5. When the mole fraction of $NaNO_3$ with respect to $KNO_3$ and $NaNO_3$ is more than about 0.5, ionic diffusion between the glass strengthening molten salt and the glass may occur unsuitably or insufficiently. For example, the glass may be strengthened unsuitably or insufficiently. When the mole fraction of $NaNO_3$ is about 0.05 or less, the freezing point of the molten salt may increase over about 320° C., so that the frozen amount of the glass strengthening molten salt remaining in the glass may increase.

In some embodiments, when the additive is KOH, the mole fraction of KOH with respect to $KNO_3$, $NaNO_3$, and KOH is more than 0 and equal to or less than about 0.001. When the mole fraction of KOH is more than about 0.001, corrosion may occur on a glass surface.

In some embodiments, when the additive is $K_2CO_3$, the mole fraction of $K_2CO_3$ with respect to $KNO_3$, $NaNO_3$, and $K_2CO_3$ may be more than 0 and equal to or less than about 0.01. When the mole fraction of $K_2CO_3$ is more than about 0.01, corrosion may occur on a glass surface (e.g., on a surface of the glass GL).

Because the glass strengthening molten salt according to embodiments of the present disclosure includes $KNO_3$ as the first salt, $NaNO_3$ as the second salt, and KOH and/or $K_2CO_3$ as the additive, and satisfies the composition ratio of each component described above, a glass having excellent appearance quality, and improved strength of a CS value of about 500 MPa or more may be provided.

However, embodiments of the glass strengthening molten salt are not limited thereto.

In some embodiments, the glass strengthening molten salt according to embodiments of the present disclosure may include $KNO_3$ as the first salt, and KCl as the second salt. The mole fraction of the additive may be 0.

In some embodiments, the mole fraction of KCl with respect to $KNO_3$ and KCl may be more than about 0.05 and equal to or less than about 0.1. When the mole fraction of KCl with respect to $KNO_3$ and KCl is more than about 0.1, or equal to or less than about 0.05, the freezing point of the molten salt may increase to about 320° C. or more, so that the frozen amount of the glass strengthening molten salt remaining in the glass may increase.

Because the glass strengthening molten salt according to embodiments of the present disclosure includes $KNO_3$ as the first salt, and KCl as the second salt, and satisfies the mole fraction of KCl with respect to $KNO_3$ and KCl being more than about 0.05 and equal to or less than about 0.1, a glass having excellent appearance quality, and improved strength may be provided.

Evaluation of Glass Characteristics

Hereinafter, a glass strengthening molten salt according to embodiments of the present disclosure and a glass strengthened by a glass strengthening method according to embodiments of the present disclosure will be described with reference to Examples and Comparative Examples.

Experimental Example 1

Evaluation of a glass strengthening molten salt including $KNO_3$ as a first salt, $NaNO_3$ as a second salt, and an additive as a third salt.

Figure 8:
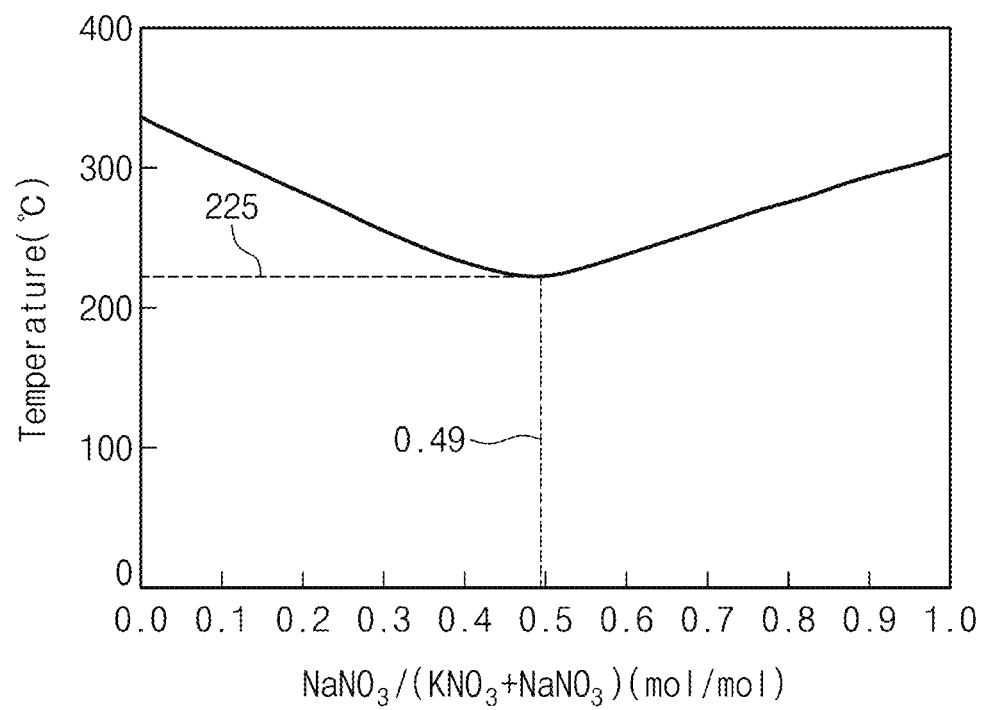
FIG. 8 is a graph showing the freezing point of a molten salt according to an embodiment.

Referring to FIG. 8, the freezing point of a glass strengthening molten salt versus a composition ratio of the first salt and the second salt will be described. FIG. 8 is a graph showing the freezing point of a molten salt according to an embodiment. For example, FIG. 8 is a graph showing the freezing point of a mixture composed of $KNO_3$ and $NaNO_3$, and shows the freezing point (° C.) versus a mole fraction of $NaNO_3$. In FIG. 8, the mole fraction of $NaNO_3$ is the number of moles of $NaNO_3$ with respect to the total number of moles of $KNO_3$ and $NaNO_3$.

Referring to FIG. 8, when the mole fraction of $NaNO_3$ in the glass strengthening molten salt according to an embodiment is more than about 0.05 and equal to or less than about 0.5, the freezing point thereof may satisfy the range equal to or higher than about 220° C. and less than about 320° C. When the mole fraction of $NaNO_3$ is about 0.05 or less, the freezing point of the molten salt may increase to about 320° C. or more, so that the frozen amount of the glass strengthening molten salt remaining in the glass may increase. When the mole fraction of $NaNO_3$ is more than about 0.5, it may not be easy to exchange sodium ions included in the glass and potassium ions included in the glass strengthening molten salt.

Test of Outer Dent and/or Wrinkle Defect of Glass

Glass strengthening molten salts of Comparative Example A, Comparative Example B, and Comparative Example C are composed of $KNO_3$ and $NaNO_3$.

Glass strengthening molten salts of Comparative Examples A to C have compositions as shown in Table 1. The mole fraction of $NaNO_3$ in Table 1 is the number of moles of $NaNO_3$ with respect to the total number of moles of $KNO_3$ and $NaNO_3$. Freezing points in Table 1 are the freezing points of molten salts each composed of $KNO_3$ and $NaNO_3$. Freezing point values corresponding to the mole fractions of $NaNO_3$ in respective Comparative Examples A to C are shown.

TABLE 1

| Classification | First salt | Second salt | Mole fraction of second salt | Freezing point (° C.) |
|---|---|---|---|---|
| Comparative Example A | $KNO_3$ | $NaNO_3$ | 0 | 335 |

TABLE 1-continued

| Classification | First salt | Second salt | Mole fraction of second salt | Freezing point (° C.) |
|---|---|---|---|---|
| Comparative Example B | $KNO_3$ | $NaNO_3$ | 0.05 | 325 |
| Comparative Example C | $KNO_3$ | $NaNO_3$ | 0.1 | 315 |

Using the glass strengthening molten salts of Comparative Examples A to C, the aforementioned glass strengthening process was performed. For example, the glass strengthening molten salts of Comparative Examples A to C were each heated to about 370° C. Thereafter, glasses were respectively immersed in the glass strengthening molten salts of Comparative Example A to C for about 14 minutes. Then, post-heat treatment and cooling described above were performed, and a strengthening process was completed. A glass of Comparative Example 1 may be strengthened using a glass strengthening molten salt of Comparative Example A. A glass of Comparative Example 2 may be strengthened using a glass strengthening molten salt of Comparative Example B. A glass of Comparative Example 3 may be strengthened using a glass strengthening molten salt of Comparative Example C.

FIGS. 9A, 9B, and 9C are photographs showing the exteriors of glasses of Comparative Examples 1 to 3, respectively.

Referring to FIGS. 9A and 9B, in the glasses of Comparative Examples 1 and 2, recesses, or dents caused by a loading device were observed. Referring to FIG. 9C, in the glass of Comparative Example 3, no cracks or dents were found, and the appearance quality thereof was improved, compared to the glasses of Comparative Examples 1 and 2.

That is, the glass strengthening molten salt of Comparative Example C may provide a strengthened glass having improved appearance quality, compared to the glass strengthening molten salts of Comparative Examples A and B. While the present disclosure is not limited by any particular mechanism or theory, it is believed that this is because the freezing point of the glass strengthening molten salt of Comparative Example C satisfies the range equal to or higher than about 220° C. and less than about 320° C., and the amount of residual salts and the frozen amount of the residual salts occurring in a glass strengthening process are reduced.

Test of CS/DOL/CT of Glass

Figure 11:
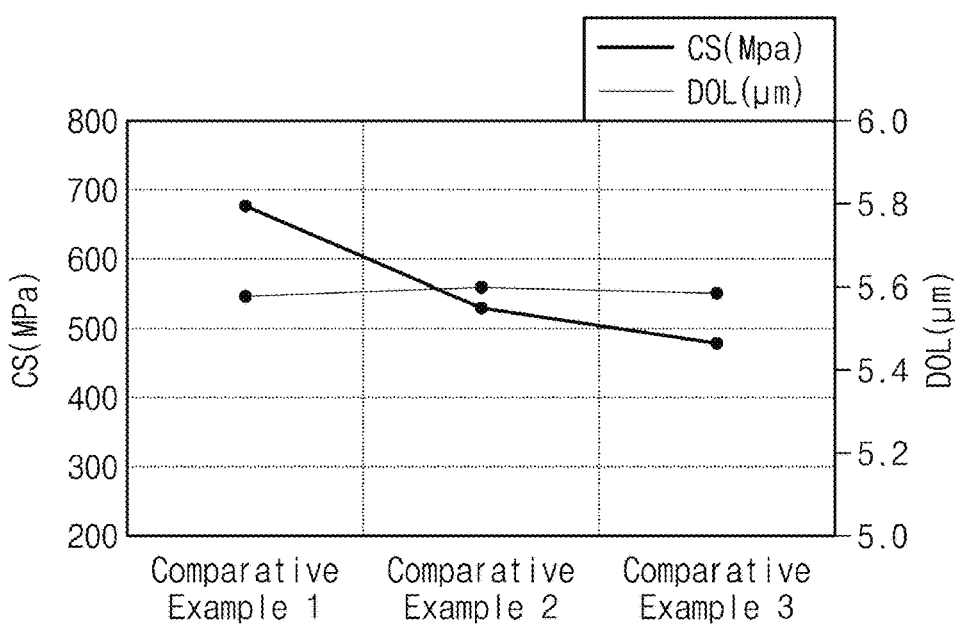
FIG. 11 is a graph showing DOL and CS values of a glass strengthened by a glass strengthening method of Comparative Example.
Figure 12:
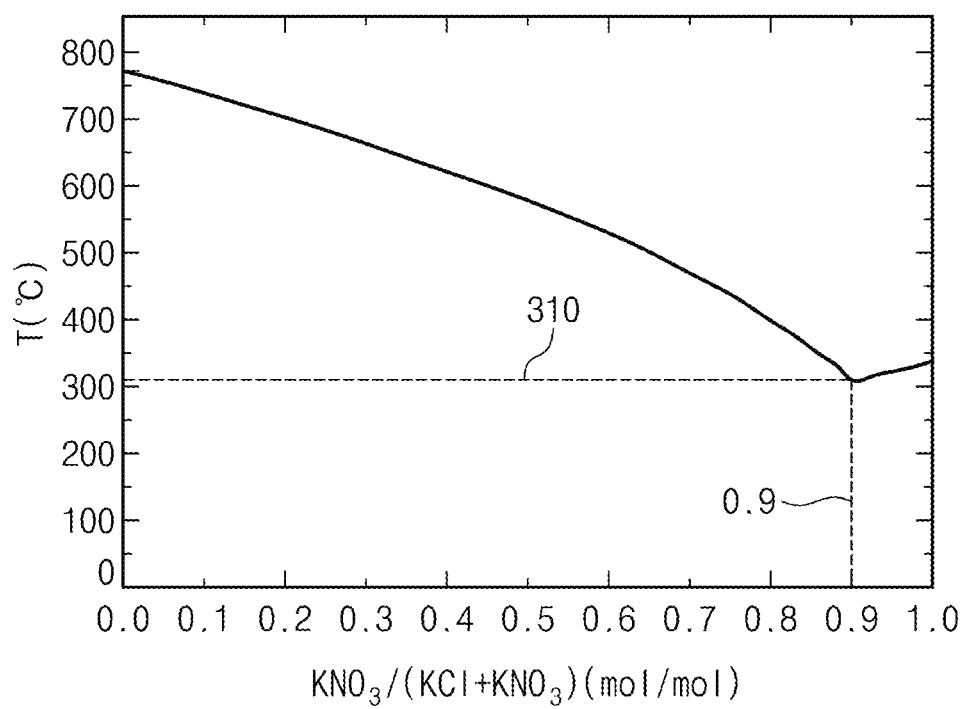
FIG. 12 is a graph showing the freezing point of a molten salt according to an embodiment.

Characteristics of the glasses of Comparative Examples 1 to 3 were evaluated. For example, the compressive stress (CS), depth of layer (DOL), and central tension (CT) values of the glasses of Comparative Examples 1 to 3 were measured. The CS may be a compressive stress formed in a glass. The DOL may indicate a depth from a glass surface to a layer where a compressive stress is formed. The CT may be the value of a stress formed in the center of a glass. Table 2, and FIGS. 11 and 12 show CS, DOL, and CT values as measured using a surface Stress Meter (FSM).

CS values were assessed as good as about 500 MPa to about 2000 MPa, and DOL values were assessed as good as about 5 μm to about 10 μm. The CT values may be determined by CS and DOL.

TABLE 2

| Classification | CS (MPa) | DOL (μm) | CT (MPa) |
|---|---|---|---|
| Comparative Example A | 678.623 | 5.582 | 165.881 |
| Comparative Example B | 531.307 | 5.606 | 130.694 |
| Comparative Example C | 482.543 | 5.591 | 138.457 |

Referring to the results shown in Table 2, the DOL values of the glasses of Comparative Examples 1 to 3 were all good. While the present disclosure is not limited by any particular mechanism or theory, it is believed that this is because the immersion time and temperature of each of the glasses of Comparative Examples 1 to 3 are all the same. It was confirmed that the CS values of the glasses of Comparative Examples 1 and 2 were about 500 MPa or more, but the CS value of the glass of Comparative Example 3 was about 500 MPa or less. That is, the glasses of Comparative Examples 1 and 2 had bad appearance quality, but were well strengthened. The glass of Comparative Example 3 had good appearance quality, but was not suitably or sufficiently strengthened.

Figure 10:
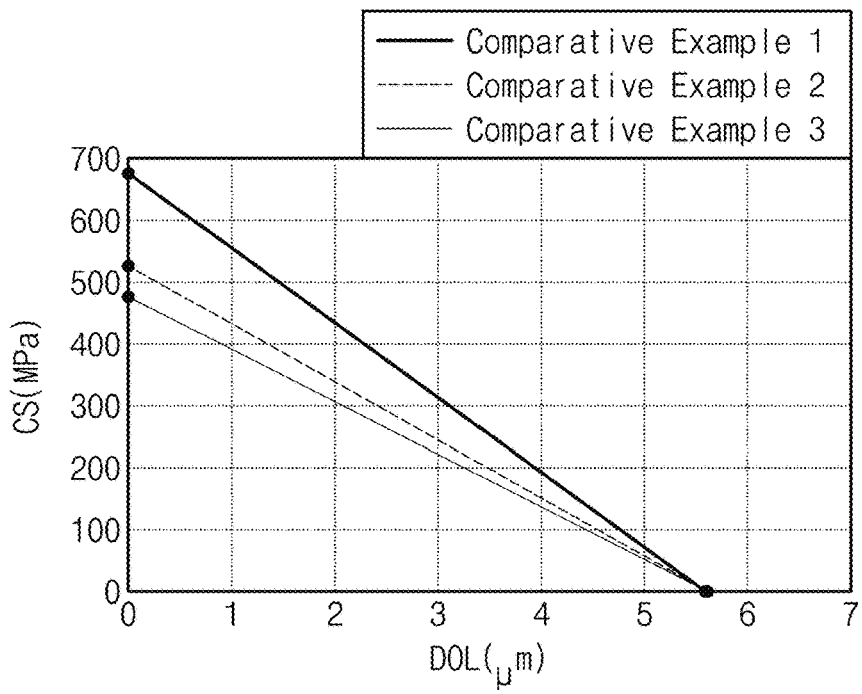
FIG. 10 is a graph showing a CS value versus a DOL of a glass strengthened by a glass strengthening method according to Comparative Example.

Referring to FIGS. 10 and 11, it was confirmed that as the mole fraction of $NaNO_3$ with respect to $KNO_3$ and $NaNO_3$ increases, the CS value of a glass decreases. For example, compared to the CS value of the glass of Comparative Example 1, the CS value of the glass of Comparative Example 3 decreased by about 29%.

To increase the CS value of a glass, whether the CS value is improved or not with or without an additive was tested.

CS Value Improvement Test with or without Additive

Using glass strengthening molten salts of Comparative Examples D to G, the degree of improving the CS value of a glass with or without an additive was confirmed. The glass strengthening molten salts of Comparative Examples D to G respectively have compositions shown in Table 3. Each of the mole fractions of the first salt, the second salt, and the additive in Table 3 is a value with respect to the total number of moles of $KNO_3$, $NaNO_3$, and the additive The glass strengthening molten salt of Comparative Example D included KOH as the additive, compared to the glass strengthening salt of Comparative Example E. The glass strengthening salt of Comparative Example F included $K_2CO_3$ as the additive, compared to the glass strengthening molten salt of Comparative Example G.

TABLE 3

| Classification | First salt | Second salt | Additive | Mole fraction of first salt | Mole fraction of second salt | Mole fraction of additive |
|---|---|---|---|---|---|---|
| Comparative Example D | $KNO_3$ | $NaNO_3$ | KOH | 0.8 | 0.199 | 0.001 |
| Comparative Example E | $KNO_3$ | $NaNO_3$ | KOH | 0.8 | 0.2 | 0 |
| Comparative Example F | $KNO_3$ | $NaNO_3$ | $K_2CO_3$ | 0.8 | 0.19 | 0.01 |

TABLE 3-continued

| Classification | First salt | Second salt | Additive | Mole fraction of first salt | Mole fraction of second salt | Mole fraction of additive |
|---|---|---|---|---|---|---|
| Comparative Example G | KNO$_3$ | NaNO$_3$ | K$_2$CO$_3$ | 0.8 | 0.2 | 0 |

Using the glass strengthening molten salts of Comparative Examples D to G, the aforementioned glass strengthening process was performed. For example, the glass strengthening molten salts of Comparative Examples D to G were each heated to about 370° C. Thereafter, glasses are respectively immersed in the glass strengthening molten salts of Comparative Example D to G for about 30 minutes. Then, post-heat treatment and cooling described above were performed, and a strengthening process was completed. A glass of Reference Example 1 may be strengthened using the glass strengthening molten salt of Comparative Example D. A glass of Reference Example 2 may be strengthened using the glass strengthening molten salt of Comparative Example E. A glass of Reference Example 3 may be strengthened using the glass strengthening molten salt of Comparative Example F. A glass of Reference Example 4 may be strengthened using the glass strengthening molten salt of Comparative Example G.

The CS, DOL, and CT values of the glasses of Reference Examples 1 to 4 were measured, and shown in Table 4.

TABLE 4

| Classification | CS (MPa) | DOL (μm) | CT (MPa) |
|---|---|---|---|
| Reference Example 1 | 346.088 | 6.504 | 107.220 |
| Reference Example 2 | 305.756 | 7.580 | 123.017 |
| Reference Example 3 | 260.781 | 7.866 | 112.266 |
| Reference Example 4 | 219.636 | 7.892 | 95.072 |

Referring to Table 4, the DOL values of Reference Examples 1 to 4 were all at least about 5 μm, which were good. The CS value of Reference Example 1 was about 13.19% higher than that of Reference 2. While the present disclosure is not limited by any particular mechanism or theory, it is believed that this is because the molten salt of Comparative Example D has a mole fraction of KOH in an amount higher than 0 and equal to or less than about 0.001, compared to the molten salt of Comparative Example E. In addition, when a molten salt has a mole fraction of KOH in an amount greater than about 0.001, the surface of a glass strengthened by the molten salt may be corroded.

The CS value of Reference Example 3 was about 18.72% higher than that of Reference Example 4. While the present disclosure is not limited by any particular mechanism or theory, it is believed that this is because the molten salt of Comparative Example F has a mole fraction of K$_2$CO$_3$ in an amount higher than 0 and equal to or less than about 0.01, compared to the molten salt of Comparative Example G. In addition, when a molten salt has a mole fraction of KOH in an amount greater than about 0.01, the surface of a glass strengthened by the molten salt may be corroded.

Referring to Tables 1 to 4, the freezing point of the molten salt of Comparative Example C of Table 1 satisfied the range equal to or higher than about 220° C. and less than about 320° C., thereby providing a strengthened glass with excellent appearance quality. However, the CS value of the glass of Comparative Example 3 strengthened by the molten salt of Comparative Example C was less than about 500 MPa, thereby resulting in a strengthening defect.

When the molten salt of Comparative Example C further includes an additive, the CS value may be improved as shown in Tables 3 and 4. For example, the molten salt of Comparative Example C has KOH in an amount higher than 0 and equal to or less than about 0.001, the CS value may be improved up to at least about 500 MPa by increasing about 13.19% from about 482.543 MPa. In some embodiments, when the molten salt of Comparative Example C has a mole fraction of K$_2$CO$_3$ in an amount greater than 0 and equal to or less than about 0.01, the CS value may be improved up to at least about 500 MPa by increasing about 18.72% from about 482.543 MPa.

Accordingly, the glass strengthening molten salt of embodiments of the present disclosure has a freezing point equal to or higher than about 220° C. and less than about 320° C., and includes KNO$_3$ as the first salt, NaNO$_3$ as the second salt, and KOH or K$_2$CO$_3$ as the additive, thereby providing a glass having excellent appearance quality, and a CS value equal to or higher than about 500 MPa. For example, the mole fraction of NaNO$_3$ with respect to KNO$_3$ and NaNO$_3$ may be more than about 0.05 and about 0.5 or less, and the mole fraction of an additive with respect to KNO$_3$, NaNO$_3$, and the additive may be 0 to about 0.01.

Experimental Example 2

Evaluation of a glass strengthening molten salt including KNO$_3$ as a first salt, and KCl as a second salt.

Referring to FIG. 12, the freezing point of a glass strengthening molten salt according to the composition ratio of a first salt and a second salt will be further described. FIG. 12 is a graph showing the freezing point of a molten salt according to an embodiment. For example, FIG. 12 is a graph showing the freezing point of a mixture composed of KNO$_3$ and KCl, and illustrates the freezing point (° C.) according to the mole fraction of KNO$_3$. The mole fraction of KNO$_3$ in FIG. 12 is number of moles of KNO$_3$ with respect to number of total moles of KNO$_3$ and KCl.

Referring to FIG. 12, when the mole fraction of KNO3 in a glass strengthening molten salt according to an embodiment is equal to or higher than about 0.9 and less than about 0.95, the freezing point of the glass strengthening molten salt may satisfy the range equal to or higher than about 220° C. and less than about 320° C.

For example, when the mole fraction of KCl is more than about 0.05 and equal to or less than about 0.1, the freezing point of the glass strengthening molten salt according to an embodiment may satisfy the range equal to or higher than about 220° C. and less than about 320° C.

When the mole fraction of KCl is about 0.05 or less, or more than about 0.1, the freezing point of the molten salt may increase to about 320° C. or more, so that the frozen amount of the glass strengthening molten salt remaining in the glass may increase.

Test of Outer Dent and/or Wrinkle Defect of Glass

Glass strengthening molten salts of Example A, Comparative Example H, and Comparative Example I are composed of $KNO_3$ and KCl.

The glass strengthening molten salts of Example A, Comparative Example H, and Comparative Example I respectively have compositions shown in Table 5. The mole fraction of KCl in Table 5 is the number of moles of KCl with respect to the total number of moles of $KNO_3$ and KCl. The freezing points in Table 5 are the freezing points of molten salts including $KNO_3$ and KCl. The freezing point values corresponding to the mole fractions of KCl of each of Example A, Comparative Example H, and Comparative Example I are shown.

TABLE 5

| Classification | First salt | Second salt | Mole fraction of second salt | Freezing point (° C.) |
|---|---|---|---|---|
| Example A | $KNO_3$ | KCl | 0.1 | 310 |
| Comparative Example H | $KNO_3$ | KCl | 0.05 | 320 |
| Comparative Example 1 | $KNO_3$ | KCl | 0 | 335 |

Using glass strengthening molten salts of Example A, Comparative Example H, and Comparative Example I, the aforementioned glass strengthening processes were performed. For example, the glass strengthening molten salts of Examples A, Comparative Example H, and Comparative Example I were each heated to about 370° C. After that, the glasses were each immersed in the glass strengthening molten salts of Example A, Comparative Example H, and Comparative Example I for about 14 minutes. Then, a post-heat treatment operation and a cooling operation described above were performed, and a strengthening process was terminated. A glass of Example 1 may be strengthened by a glass strengthening molten salt of Example A. A glass of Comparative Example 4 may be strengthened by a glass strengthening molten salt of Comparative Example H. A glass of Comparative Example 5 may be strengthened by a glass strengthening molten salt of Comparative Example I.

Figure 13A:
FIG. 13A is a photograph of a glass strengthened by a glass strengthening method according to Example.
Figure 13B:
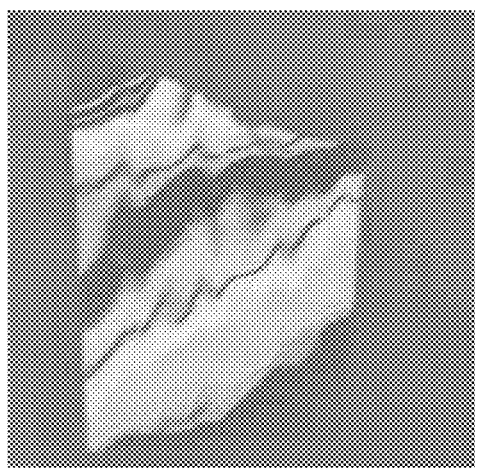
FIG. 13B is a photograph of a glass strengthened by a glass strengthening method according to Comparative Example.

FIGS. 13A and 13B are appearance photographs of glasses of Example 1 and Comparative Example 5.

Referring to FIG. 13A, no dents or cracks were found in the glass of Example 1. Referring to FIG. 13B, a recess or a dent by a loading device were observed in the glass of Comparative Example 5. That is, the glass in Example 1 had improved appearance quality, compared to the glass in Comparative Example 5.

While the present disclosure is not limited by any particular mechanism or theory, it is believed that this is because the freezing point of the glass strengthening molten salt of Example A satisfies the range equal to or higher than about 220° C. and less than about 320° C., so that the amount of residual salts and the frozen amount of the residual salts occurring in a glass strengthening process were reduced.

Because the freezing point of the glass strengthening molten salt of Comparative Example H was about 335° C., the viscosity thereof increased and the fluidity thereof decreased, compared to the glass strengthening molten salt of Example A. Accordingly, while the present disclosure is not limited by any particular mechanism or theory, it is believed that when the salt remaining in the glass or the loading device occurred and froze, damage occurred to the exterior of the glass.

Test of CS/DOL/CT of Glass

The CS, DOL, and CT of the glasses of Example 1, Comparative Example 4, and Comparative Example 5 were measured and shown in Table 6, FIGS. 11, and 12. The CS value was assessed as good as about 500 MPa to about 2000 MPa, and the DOL value was assessed as good as about 5 μm to about 10 μm. The CT value may be determined by the CS and the DOL

TABLE 6

| Classification | CS (MPa) | DOL (μm) | CT (MPa) |
|---|---|---|---|
| Example 1 | 674.924 | 7.066 | 240.028 |
| Comparative Example 4 | 692.203 | 7.757 | 290.464 |
| Comparative Example 5 | 658.496 | 8.499 | 329.176 |

Referring to the results shown in Table 6, the DOL values of the glasses of Example 1, Comparative Example 4, and Comparative Example 5 were all good. While the present disclosure is not limited by any particular mechanism or theory, it is believed that this is because the immersion time and temperature of each of the glasses of Example 1, Comparative Example 4, and Comparative Example 5 were the same. The CS values of Example 1, Comparative Example 4, and Comparative Example 5 were all good as about 500 MPa or more.

Figure 14:
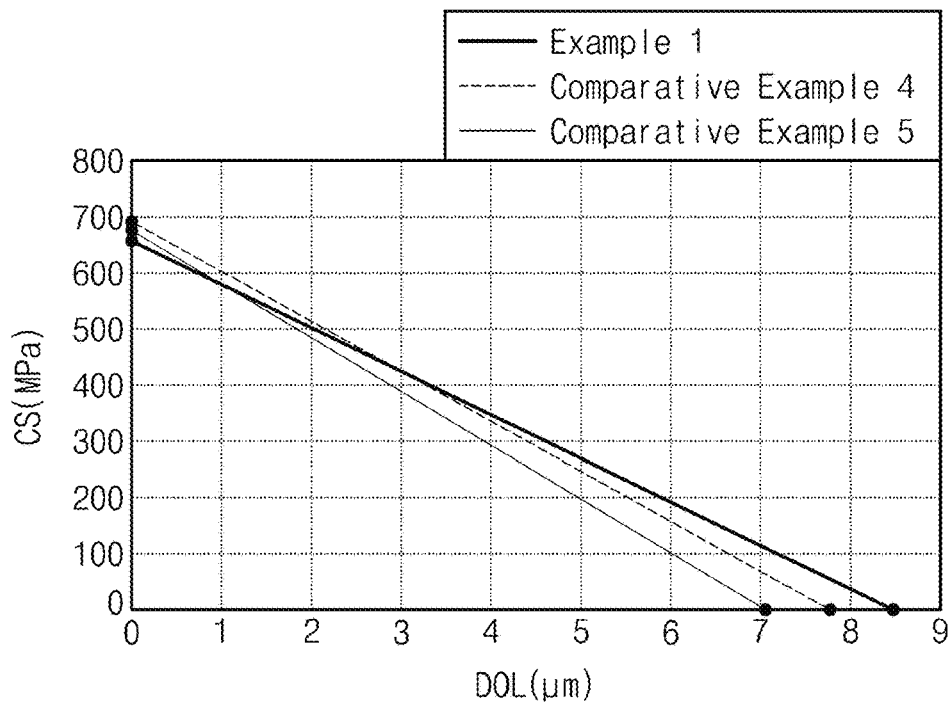
FIG. 14 is a graph showing a CS value versus a DOL of each of glasses strengthened by respective glass strengthening methods according to Example and Comparative Example.
Figure 15:
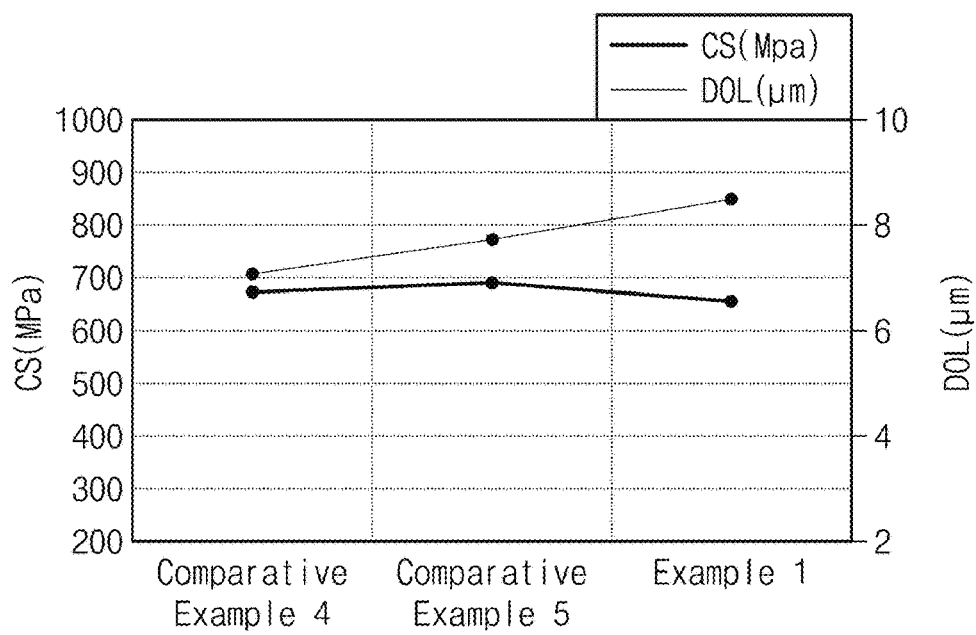
FIG. 15 is a graph illustrating DOL and CS values of each of glasses strengthened by respective glass strengthening methods according to Example and Comparative Example.

Referring to FIGS. 14 and 15, the DOL/CS value of Example 1 was measured to be about 0.0129 μm/MPa, the DOL/CS value of Comparative Example 4 was measured to be about 0.0112 μm/MPa, and the DOL/CS value of Comparative Example 5 was measured to be about 0.0105 μm/MPa. That is, the DOL/CS value of Example 1 may be about 0.0113 μm/MPa or more.

Referring to FIGS. 13A, 13B, 14, and 15 together, the glass of Example 1 showed good CS and DOL values, and improved appearance quality. The glasses of Comparative Example 4 and Comparative Example 5 showed good CS and DOL values, but defective appearance quality.

A glass strengthening molten salt according to embodiments of the present disclosure satisfies the range of a freezing point equal to or higher than about 220° C. and less than about 320° C., and includes $KNO_3$ as a first salt and KCl as a second salt, thereby providing a glass having excellent appearance quality and a CS value greater than about 500 MPa. For example, the mole fraction of KCl with respect to $KNO_3$ and KCl is greater than about 0.05 and equal to or less than about 0.1, and the mole fraction of an additive is 0 to about 0.01 or less. For example, the mole fraction of the additive may be 0.

The glass strengthening molten salt according to embodiments of the present disclosure includes a first salt and a second salt different from each other, the first salt is $KNO_3$, and the second salt is a salt containing at least one ion of $Li^+$, $Na^+$, $K^+$, $Cs^+$, and/or $Rb^+$. The glass strengthening molten salt according to embodiments of the present disclosure satisfies the range of a freezing point equal to or higher than about 220° C. and less than about 320° C., thereby chemically strengthening a glass while maintaining excellent appearance quality.

A glass strengthening method according to embodiments of the present disclosure includes a preparing operation of providing a glass and a strengthening operation of providing the glass with a molten salt, and uses a glass strengthening molten salt according to embodiments of the present disclosure in the strengthening operation, thereby decreasing the generation and the freezing of residual salts in the glass strengthening operation, and preventing or reducing the deterioration of the appearance quality of the glass.

A glass strengthening molten salt according to an embodiment may strengthen a glass without (or substantially without) damaging the exterior of the glass.

A glass strengthening method according to an embodiment may provide a method for strengthening a glass while preventing or reducing damage and/or deformation of the glass.

The above description has been made with reference to example embodiments of the present disclosure, but those skilled in the art or those of ordinary skill in the relevant technical field may understand that various modifications and changes may be made to the subject matter of the present disclosure without departing from the spirit and the technical scope of the present disclosure as described in the appended claims, and equivalents thereof.

Therefore, the technical scope of the present disclosure is not limited to the contents described in the detailed description of the specification, but should be determined by the appended claims, and equivalents thereof.

What is claimed is:

1. A glass strengthening method comprising:
preparing a glass;
heating the glass to a first temperature of about 350° C. to about 400° C.; and
strengthening the glass by providing the glass with a molten salt,
wherein the molten salt has a freezing point equal to or higher than about 220° C. and less than about 320° C., and
wherein the molten salt comprises $KNO_3$ and $NaNO_3$, and a mole fraction of $NaNO_3$ with respect to $KNO_3$ and $NaNO_3$ is more than about 0.05 and about 0.5 or less.

2. The glass strengthening method of claim 1, wherein the molten salt further comprises, as an additive, at least one of KOH, $K_2CO_3$, $K_3PO_4$, $Al_2(SO_4)_3$, $Al(NO_3)_2$, $K_2SiO_3$, $Na_2SiO_3$, KCl, $Ca(NO_3)$, and/or $Mg(NO_3)_2$.

3. The glass strengthening method of claim 2, wherein a mole fraction of the additive with respect to the molten salt is 0 to about 0.01.

4. The glass strengthening method of claim 1, wherein the molten salt further comprises KOH as an additive, and a mole fraction of KOH with respect to $KNO_3$, $NaNO_3$, and KOH is more than 0 and about 0.001 or less.

5. The glass strengthening method of claim 1, wherein the molten salt further comprises $K_2CO_3$ as an additive, and a mole fraction of $K_2CO_3$ with respect to $KNO_3$, $NaNO_3$, and $K_2CO_3$ is more than 0 and about 0.01 or less.

6. The glass strengthening method of claim 1, wherein the molten salt is heated to the first temperature.

7. The glass strengthening method of claim 1, further comprising, after removing the glass from the molten salt, performing a post-heat treatment for heating the glass to a second temperature that is different from the first temperature.

8. The glass strengthening method of claim 7, wherein the second temperature is about 220° C. to about 370° C.

9. The glass strengthening method of claim 1, wherein the glass has a thickness of about 10 μm to about 50 μm.

10. The glass strengthening method of claim 1, wherein a compressive stress (CS) of the glass after the strengthening is about 500 MPa to about 2000 MPa.

11. The glass strengthening method of claim 1, wherein a depth of layer (DOL) of the glass after the strengthening is about 5 μm to about 10 μm.

12. The glass strengthening method of claim 1, wherein the molten salt further comprises $KNO_3$ and KCl, and a value of DOL/CS of the glass after the strengthening is about 0.0113 μm/MPa or more.

* * * * *